(12) United States Patent
Wolfe

(10) Patent No.: US 8,126,442 B2
(45) Date of Patent: Feb. 28, 2012

(54) RF TO IP BRIDGE SYSTEM AND METHOD OF USE

(75) Inventor: David M. Wolfe, Nicktown, PA (US)

(73) Assignee: Saint Francis University, Loretto, PA (US)

( * ) Notice: Subject to any disclaimer, the term of this patent is extended or adjusted under 35 U.S.C. 154(b) by 886 days.

(21) Appl. No.: 11/806,516

(22) Filed: May 31, 2007

(65) Prior Publication Data

US 2008/0299899 A1 Dec. 4, 2008

(51) Int. Cl.
*H04L 29/08* (2006.01)

(52) U.S. Cl. ............... 455/414.4; 370/352; 370/401; 370/466

(58) Field of Classification Search .......... 370/328, 370/338, 310, 400–403, 395.5, 395.52, 492, 370/501, 315, 316, 318, 310.2, 351–356, 370/466; 455/550.1, 556.2, 561, 41.2, 421, 455/418, 552.1, 553.1, 556.1, 414.4, 403, 455/101–103, 500, 404.1, 414.1, 422.1, 444–446, 455/465, 456.5, 11.1, 13.1, 560; 340/287–309; 379/37–51

See application file for complete search history.

(56) References Cited

U.S. PATENT DOCUMENTS

| | | | | |
|---|---|---|---|---|
| 6,011,323 A * | 1/2000 | Camp | | 307/64 |
| 6,272,120 B1 | 8/2001 | Alexander | | |
| 6,366,771 B1 | 4/2002 | Angle et al. | | |
| 6,402,031 B1 * | 6/2002 | Hall | | 235/400 |
| 6,584,080 B1 * | 6/2003 | Ganz et al. | | 370/315 |
| 6,826,174 B1 | 11/2004 | Erekson et al. | | |
| 7,023,821 B2 | 4/2006 | Wotherspoon et al. | | |
| 7,099,295 B1 * | 8/2006 | Doyle et al. | | 370/338 |
| 7,187,941 B2 * | 3/2007 | Siegel | | 455/519 |
| 2003/0008564 A1 * | 1/2003 | Lebron | | 439/638 |
| 2005/0023186 A1 * | 2/2005 | Hassett | | 206/589 |
| 2005/0259608 A1 * | 11/2005 | Ortega | | 370/328 |
| 2006/0067266 A1 | 3/2006 | Ehlers et al. | | |
| 2006/0268807 A1 | 11/2006 | Meier | | |

FOREIGN PATENT DOCUMENTS

WO WO 2005/088998 9/2005

OTHER PUBLICATIONS

Tom Pfeifer, Dirk Elias, "Commercial Hybrid IR/RF Local Positioning System", Univeristy of Leipzing, Germany, Feb. 26-28, 2003.*
e-device Technology Connecting Devices, Internet-Connected Wireless M2M Network; www.edevices.com, 2004.

* cited by examiner

*Primary Examiner* — Kent Chang
*Assistant Examiner* — San Htun
(74) *Attorney, Agent, or Firm* — Breneman & Georges

(57) ABSTRACT

A two component highly portable and lightweight system for extending the transmission capabilities of Land Mobile Radio systems into areas lacking coverage due to structures, depth below the earth's surface, or varying terrain or other dead zones lacking coverage. The system utilizes the Radio over IP protocol to transfer two-way audio from one radio to another radio for re-broadcast inside a dead zone over a 900 MHz Ethernet-based point-to-point wireless link. The novel system includes RF to TCP/IP conversion and digital data transmission followed by a TCP/IP conversion to RF radio link and provides components and a method for bridging RF radio into dead zones.

46 Claims, 19 Drawing Sheets

Prior Art- Mobile Repeater

Our Invention-RoIP Extension Box

RF TO IP BRIDGE SYSTEM AND METHOD OF USE

STATEMENT REGARDING FEDERALLY SPONSORED RESEARCH OR DEVELOPMENT

The subject matter of this patent application was supported by Saint Francis University's Center for Excellence for Remote and Medically-Under Served Areas (CERMUSA) and administered by the U.S. Army Medical Research and Material Command's (USAMRMC) Telemedicine and Advanced Technology Research Center (TATRC), Fort Detrick, Md.—Contract No. W81XWH-06-2-0018 and is subject to a royalty free license for the U.S. Army Medical Research and Material Command (USAMRMC).

CROSS REFERENCE TO RELATED APPLICATIONS

The subject matter of this application is also related to a design application filed concurrently herewith entitled Communications Device.

INCORPORATION-BY-REFERENCE OF MATERIAL SUBMITTED ON A COMPACT DISC

Not Applicable.

REFERENCE TO A "MICROFICHE APPENDIX"

Not Applicable.

BACKGROUND OF THE INVENTION

1. Field of the Invention

The invention pertains to a wireless radio over internet protocol RoIP communications system and a method of use. More particularly the invention relates to a rapidly deployed RoIP communications bridge connecting wireless radio to areas, buildings and structures inaccessible or poorly covered by licensed radio repeaters.

The novel RoIP communications bridge system and method employs a two component bridge. The first wireless radio to IP conversion component device is disposed at a location in communication with a licensed radio repeater (LRR). A second wireless radio to IP conversion component device is disposed at a location inaccessible or poorly covered by the licensed radio repeater. An IP to IP link is established between the first wireless radio to IP conversion component device and the second wireless radio to IP conversion component device.

The novel system and method provides an emergency response communications (ERC) bridge for fire, police and emergency rescue operations to seamlessly connect Emergency Rescue Operations (ERO) with emergency on site personnel in areas not served or poorly served by available licensed radio repeaters. The novel system provides small portable suitcase type devices containing components for transmitting audio signals over a wireless computer network via the conversion of licensed radio frequency (RF) audio communications to transmit control protocol/internet protocol (TCP/IP) and back to extend audio communications into areas isolated from licensed radio repeaters.

2. Description of the Prior Art

The importance of a seamless communications connection between Emergency Rescue Operations (ERO) and on site emergency responders cannot be underemphasized. Lessons learned from emergency rescue operations demonstrate that many times communications between emergency rescue operations and on site emergency responders are lost when the on site emergency responders enter buildings, structures, vessels or disaster areas where the communication link is lost between a licensed radio repeater and the radios carried by the emergency responder. These areas are typically referred to as "dead zones."

Lost communications between Emergency Rescue Operations (ERO) and emergency operations are all the more frustrating and dangerous when emergency responders inside the building, structure, vessel or disaster area cannot communicate with emergency responders outside the building, structure, vessel or disaster area or with ERO. Such loss of communications many times results in loss of life, delays in sending emergency responders to the site as well as sending additional emergency vehicles such as ambulances, medics, paramedics and reinforcements needed to manage the emergency. The loss of communications between emergency responders outside and those inside the building, structure, vessel or disaster area results in delay and the taking of unnecessary risks when information cannot be shared between inside and outside emergency responders.

The best known prior is illustrated in prior art FIGS. 1 and 2. Such prior art provides a rapid-response emergency communications command vehicle 39 incorporating some form of a mobile two-way radio repeater 38 often with built-in cross-banding technology. This vehicle usually parks near an area of limited to no-connectivity ("dead zones") and activates a high-powered base-station repeater 38 to extend and provide voice connectivity to personnel beyond range of the established communications infrastructure.

These "mobile repeaters" are commonly available to police, fire, and EMS departments. Although this system works well, it has drawbacks. The mobile repeaters are usually very expensive, sometimes costing tens of thousands of dollars. Equipment is cumbersome and can require permanent, standard 19" rack-mounting in the vehicle. High power two-way radios are usually hard wired to these mobile repeaters, which require use of large external antennas and draw significant current from the on-board 12 Volt power system of the vehicle. Additionally such communications vehicles add additional vehicle clutter around a disaster area.

The rapid response emergency communications command vehicle 39 in prior art FIG. 1 allows outside emergency responder 21 or for example a fireman 21 at the scene to use portable radio 21A to communicate to an inside emergency responder 32 and 35 and emergency rescue operations ERO 25 by signal 22 to a licensed radio repeater 20 several miles away which is transmitted to ERO 25 by signal 26 and to inside emergency responders through signal 23 which is rebroadcast through high power mobile repeater 38 by signal 40 which is now able to reach emergency responders 32 and 35 through their portable radios 32A and 35A respectively. Licensed radio repeater 20 may be connected to ERO by hard wire or wirelessly as shown in FIG. 1. Licensed radio repeater 20 also transmit signal 23 to outside emergency responder 27 or a fireman 27 through his portable radio 27A.

Audio signals sent by ERO 25 are received by licensed radio repeater 20 and transmitted by signal 23 to mobile repeater 38 through repeater channel 36 and outside emergency responders 21, 27 and inside emergency responders 32 and 35 through high power mobile repeater 35 and signal 40. The prior art mobile radio repeater 38 is a large piece of equipment weighing approximately 50 pounds or more and is housed in a container of about 19 inches by 19 inches by 12 inches or larger.

The prior art system of FIG. 1 works the same way in both directions. Audio can be sent from radios within the building and received by radios outdoors. Insider emergency responders 32 and outside emergency responders 35 within the structure and out of repeater coverage are now able to communicate with the dispatch center and any personnel outside who are within repeater coverage and vice versa. The best known prior art system works by having the outside emergency responders to have their portable radios on two channels one covered by signal 23 to be connected to signals from ERO 25 and a second channel covering signals 40 so that they can be in the loop of communications between both ERO and inside emergency responders 32 and 35.

In this best known prior art in use provides a communications bridge by a mobile high powered radio bridge to interconnect a licensed radio repeater to a mobile repeater mounted in a rapid response communications vehicle. This repeater box contains two high-powered two-way radios. The audio channels of each radio are directly connected to each other. The repeater functions similar to how a tower-mounted repeater functions. Communications from the repeater on the hill are received by the mobile unit and rebroadcast on a secondary channel to the local area requiring enhanced coverage. All personnel in this area tune their portable radios to this secondary channel and communicate through the mobile repeater to emergency responders inside the dead zone which also communicate with the repeater box to emergency responders outside the dead zone.

Referring now to FIG. 2 the components used in the Prior Art mobile repeater system are illustrated. It consists of two high-power mobile radios 69 and 70 programmed for separate channels and mounted in vehicle 39 (FIG. 1). The audio channels and control ports of both radios are connected together. Separate external omni-directional antennas 50 and 50A are connected to each radio. The mobile repeater system 38 (FIG. 1) is connected to a power source and is ready for operation. Modulated voice traffic received on one radio within the unit is transferred through the audio channel to the second radio and re-broadcast at a much higher power to the local area on a second channel.

The high power two-way radios 69 and 70 of the prior art are usually hard wired to the mobile repeater 38 in vehicle 39, which require use of large external antennas and draw significant current from the on-board 12 Volt power system of the vehicle. Additionally such vehicles add to vehicle clutter at an emergency scene and have the drawback of delay in requiring the presence of a specialized vehicle at an emergency site.

As will be recognized by those skilled in the art emergency and disaster areas are often crowded with vehicles and difficult to reach. Reducing the amount of vehicles in a disaster area saves space, cost of acquisition and operation. Replacing a communications vehicle with a lightweight communications device the size of two suitcases that can be carried with a fire truck or ambulance to replace a special communications truck not only saves an enormous amount of money but also reduces the number of vehicles required to navigate to an emergency or disaster area.

A highly compact and mobile emergency response communications ERC system as is provided in accordance with the invention would prove valuable for other emergency and disaster areas and operations such as ships stricken at sea where weight of communications equipment aboard helicopters and planes are significant weight considerations. The highly mobile and lightweight devices of the invention allows inside emergency responders sent into dead zones such as buildings, or lowered down from helicopters onto stricken ships and into mines to carry a lightweight and portable communications device or life line with them to link them with outside emergency responders on board helicopters or outside the dead zone while also connecting them to their Emergency Response Operations.

The most pertinent prior art uncovered in the patent and publications prior art search included numerous types of wireless communication repeaters using non-licensed frequency ranges in the 900 MHz and 2.4/5.8 WiFi bands.

Repeaters are referred to as "mesh" or "self-healing" networks, examples of repeaters can be found in prior patent applications. No prior art repeater uncovered in the search referenced the use of non-licensed data radios to extend licensed radio frequencies in a dead zone utilizing a lightweight rapidly-deployable system.

Ganz et al. U.S. Pat. No. 6,584,080 B1 provides a Wireless Burstable Communications Repeater where the repeaters are used to extend Ethernet and Internet access from a central location for the purpose of remote data access. Ganz, et al. 6,584,080 B1 does not provide a portable rapidly deployable system for expanding the reach of pre-existing licensed RF voice communications to extend communications into areas isolated from licensed radio repeaters.

In a similar manner, Meier published Application No. US 2006/0268807 A1 for a Radio Frequency Local Area Network provides a system of using multiple "hops" to achieve data communications from nodes back to a central computer. Meier does not provide for a rapidly deployable communication system for converting licensed RF to IP to expand the reach of voice communications. Alexander U.S. Pat. No. 6,272,120 B1 provides for a multi-radio bridge for connecting multiple LANs together for data and voice communications to reduce the total number of radio access points.

All of the aforementioned prior art uncovered does not provide a portable rapidly deployable communications system for expanding wireless radio into dead zones.

Other prior art uncovered included Wotherspoon et al. U.S. Pat. No. 7,023,821 B2 which provides Voice Over IP Transceiver for independently managed call groups and multiple talk frequencies, but requires the presence of an established local area network (LAN) or wide area network (WAN) to function. The Wotherspoon et al. system does not use the system to extend existing licensed RF voice communications or provide for rapidly deploying such a system. Angle et al. U.S. Pat. No. 6,366,771 B1 provides a Wireless Communication Network Having Voice and Data Communications Capability for a wireless network having a backbone and a plurality of access points. Angle, et al. does not extend the wireless network into areas lacking wireless coverage or provide a rapidly deployable bridging function for licensed RF voice communications.

Erekson et al. U.S. Pat. No. 6,826,174 B1 provides a Voice-Over-IP-Interface for Standard Household Telephone and utilizes a standard analog cordless telephone handset as the voice interface for a digital communications system. In this case, a legacy technology (the telephone) is adapted for use with a digital "backhaul" through a technology conduit which converts voice communications to packet data. The packet data is then converted back to analog audio and transmitted through a telephone handset at the far end of the call, thereby extending voice services in a way very familiar to the end user, namely, a residential telephone customer. This prior art as well as the previously described prior art does not provide for a rapidly deployable wireless network system for expanding communication coverage into dead zones.

International Publication Number WO 2005/088998 of Hawkins, et al. utilizes GSM voice cellular signals and equipment for the transmission of data. Despite the potential uses in extending data services via existing GSM cellular voice channels, the publication does not provide for a portable rapidly deployable system to extend licensed RF voice communications into dead zones.

Ehlers, et al. U.S. Publication US 2006/0067266 A1 provides for a Radio over Internet protocol (RoIP) for police and fire department dispatchers. Ehlers, et al. uses the system to mute receive path audio packets to eliminate the need for a dedicated echo canceller while the console operator is transmitting. Ehlers, et al. like the other prior art does not provide a rapidly deployable bridging function to extend licensed RF voice communications into a dead zone.

The known prior art does not provide a lightweight tool case sized communications device weighing approximately 25 pounds or less with dimensions of about 13.5 inches wide, 10.5 inches long and 6 inches thick for extending wireless networks into areas lacking wireless radio coverage. The prior art systems also do not provide for the transmission of audio signals over a wireless computer network via the conversion of licensed radio frequency (RF) audio communications to transmit control protocol/internet protocol (TCP/IP) and back again to extend radio coverage into dead zones and areas cut off from licensed radio repeaters. The novel system method and components provide a seamless communications link that is fully compatible with existing portable radio transmitters employed by emergency responders.

SUMMARY OF THE INVENTION

The invention provides a mobile and lightweight two component communications bridge with each of the components housed in a case resembling a tool case and weighing approximately 25 lbs. each or less and having the dimensions of approximately 13.5 inches wide, 10.5 inches long and 6 inches high. The novel communications bridge is preferably housed in a water resistant case and preferably each case is identical in construction, shape and appearance for rapid deployment and use by emergency responders.

One of the components or the first component of the novel two component bridge is set up in an area with a communications link to a licensed radio repeater tower. The other component or second component is carried by the emergency responder, turned on, and left in a dead zone or area where communication with the licensed radio repeater would otherwise be restricted due to buildings, structures, or even the curvature of the earth such as where rescue operations involve a stricken ship below the line of sight horizon and has the second component lowered on board and a helicopter or aircraft is overhead and in line of sight communication with a licensed radio repeater and has on board the first component of the novel two component bridge. After leaving the second component in the dead zone the emergency responder then is free to roam in the dead zone and communicate in the dead zone through his two-way radio which is received by the second component in the dead zone and converted and transmitted to the first component through IP protocol and again converted to RF signals and seamlessly transmitted to emergency responders outside the dead zone and to ERO through a licensed repeater.

As previously indicated both housings and components of the two component bridge may be identical or different. In the best mode both components of the two component bridge are identical for ease of use and rapid deployment. In this way the component entering the dead zone looks, functions and operates exactly the same as the component outside the dead zone that is in communication with the licensed radio repeater.

The invention may be practiced by employing different cases for the components and different components. For example in the best mode the component staying outside the dead zone may have solar cells for recharging batteries, a charge port and other peripherals and equipment that need not be present on the component brought into the dead zone since the dead zone may not have access to solar energy or battery charging connections. Similarly the components inside the case for use inside and outside the dead zone may be the same or different, for example, the component for deployment inside the dead zone could have batteries with a greater storage capacity. However such differences are not in accordance with the best mode and preferred embodiment of the invention where both the inside component and outside component are identical. Identical components are preferred since rapid deployment and use and interchangeability is impeded by having to separate an inside component from an outside component in an emergency.

Both components of the novel two component bridge provide a seamless interface with the portable radios used by emergency responders. In one embodiment of the invention one of the portable radios may be connected via an adaptor to the inside component of the two component bridge and one of the portable radios may be connected to the outside component of the two component bridge. In another embodiment of the invention both two-way radios can be included as a component of each of the two components of the two component communications bridge.

Licensed two-way radio frequency (RF) voice systems are the most common means of communication for fire, police, and first responder professions. This form of communication is practical due to reliability of. the equipment, dedicated (licensed) frequencies, and wide areas of signal propagation from tower sites and other repeaters. Despite these advantages, licensed two-way RF systems can become problematic to use within buildings, heavy foliage, mines, or other areas where a direct line-of-sight path between a radio communications device and the associated licensed repeater is not possible due to physical obstructions or lack of adequate infrastructure (described earlier in this document as "dead zones.") Personnel operating within these "dead zones" are often unable to use two-way voice radios to hit the radio repeaters needed to communicate with other on site emergency personnel, dispatch centers, or external resources, and Emergency Rescue Operations (ERO).

Communications dead zones within these areas of known coverage loss can be overcome via the use of a rapidly deployable system capable of temporarily extending audio communication into an area lacking coverage. Saint Francis University's Center of Excellence for Remote and Medically Under-Served Areas (CERMUSA) has developed a rapidly-deployable modular device for extending the reach of licensed two-way RF systems into areas limited by physical obstructions or dead zones between radio communications devices and the associated licensed repeaters. This device, known as an RF to IP Radio Bridge, makes use of the Radio over IP (RoIP) protocol, a new and evolving standard very similar to Voice over IP (VoIP).

In the preferred embodiment of the invention the novel two component RF to IP Radio Bridge functions as follows: A licensed frequency voice radio within usable range of an associated repeater is attached to the outside component of the RF to IP Radio Bridge. The RF to IP Radio Bridge captures the "transmit" and "receive" audio from the voice radio and converts this audio to digital packet data using the transmit control protocol/internet protocol (TCP/IP). This packet data is then transmitted to the second component of the novel RF to IP Radio Bridge, which is then placed in the dead zone or outside the range of the associated repeater. The second RF to IP Radio Bridge is attached to a second licensed frequency voice radio on a different channel. This packet data is converted back to audio and transmitted via the attached licensed frequency voice radio. The two RF to IP Radio Bridges are connected using ISM Band designated Non Licensed wireless radios, including but not limited to 900 MHz, 2.4 GHz (802.11b/g), and 5.8 GHz (802.11a). Additionally, the licensed frequency voice radios attached to either RF to IP Radio Bridge are configured for separate channels, thereby avoiding any chance of interference between the radios.

Each RF to IP Radio Bridge in the best mode is configured in a durable weather and shock resistant carrying case that includes both an on-board rechargeable power supply and peripherals for attaching to other power sources, such as solar, 110 Volt AC and external 12 Volt DC batteries. The RF to IP Radio Bridge boxes are each designed to be easily carried and weigh less than 25 lbs.

The RF to IP Radio Bridge boxes are configured to accept audio from any type of analog or digital portable radio with the proper interface cable or by the use of an adaptor. Unlike the in use prior art mobile repeater solution described in the background of the invention, the system of the invention is lightweight, utilizes low power portable radios to interface with each component of the two component RF to IP Radio Bridge. As a result the novel two component RF to IP Radio Bridge is not only lightweight, consumes much less power but also takes up less space than the prior art mobile radio repeaters. Due to its modular component system format any non functioning unit can be readily replaced. In addition if a licensed FCC radio is broken another one can be quickly substituted at the emergency site.

Also, as long as proper audio interface cables or adaptors are available, the system of this embodiment of the invention is rapidly reconfigurable to almost any digital or analog portable radio in any frequency band. However as previously discussed in an alternative embodiment of the invention a licensed frequency RF radio can be built into each component of the two component RF to IP Radio Bridges thereby eliminating the use of adaptors.

The connection between the two RF to IP Radio Bridges enables voice traffic to be seamlessly routed between personnel operating in areas not inherently covered by licensed RF and personnel operating within a coverage area. An example would be installing an RF to IP Radio Bridge near the entrance of a building and a second in a stairwell to extend licensed frequency voice radio coverage to other levels of the structure, where licensed radio coverage has been documented as intermittent or non-existent as well as a connection to one or more mesh nodes to extend the span of the novel multi-component bridge to connect the first component and the second component together. Alternatively and/or additionally one or all of the RF to IP Bridge components could include an ISM Band transceiver having mesh node capabilities as will be discussed later in greater detail.

The system of the two more component RF to IP'Radio Bridge includes in one embodiment an interface means for connecting to various wireless portable RF radios and provides a first audio conversion of licensed radio frequency RF communications to transmit control protocol/internet protocol (TCP/IP). The converted audio data in the form of digital packet data is transmitted to the second component RF to IP Radio Bridge outside the range of the Licensed Radio Repeater. The digital packet data is then reconverted in the second component RF to IP Radio Bridge into RF communications which is transmitted through one of the corresponding wireless portable RF radios connected at the other end of the bridge. The RF communications through the corresponding RF radio is then rebroadcast in the dead zone or area lacking RF coverage.

In another embodiment of the system of the invention the RF to IP Radio Bridge includes built-in RF radios in each component of the RF to IP Radio Bridge. In this embodiment of the novel system an interface means for connecting various types of wireless portable RF radios at either end of the novel RF to IP Radio Bridge is not required.

The components in each component of the novel two component bridge include a Radio over IP Network Extension Unit, a Point-to-Point Non licensed ISM-band radio capable of sending standard TCP/IP data packets from one location to another, a 5-port Ethernet switch for connecting standard TCP/IP Ethernet devices together in a hub topology, a portable power supply and an antenna. Optional components include an extra battery, a battery charger, a charge controller, a voltage monitor, solar cells and LED indicator lights as well as peripherals and ports in the case housing the electronic components.

The Radio over IP Network Extension Unit accepts RF radio communications signals and converts audio into TCP/IP data packets for transmission over any type of Ethernet network, wireless or wired. The Radio over IP Network Extension Unit also accepts TCP/IP data packets and converts them to audio. Radio over IP Network Extension Units may be obtained from Raytheon and are currently sold under the model designation NXU-2A which includes a filter circuit.

The Point-to-Point non licensed ISM Band radio is a radio capable of sending TCP/IP data packets from one location to another and uses DTS/FHSS modulation. A Point-to-Point radio may be obtained from a variety of manufacturers including MDS under the model number iNET-II-900 MHZ Point-to-Point radio, Cisco, 3 Com and Net Gear. These Point-to-Point radios as well as other Point-to-Point wireless radios with an Ethernet interface and a data rate of at least 512 kbps can be used. Preferably the Point-to-Point ISM Band radio operates on a 12 Volt DC power source. Other alternatives include an AvaLan AW 900I 1.54 Mbps line of sight 900 MHZ Point-to-Point Wireless Ethernet indoor long range bridge.

A 5 port Ethernet switch is used in the preferred embodiment to connect standard TCP/IP Ethernet devices together in a hub topology. Any type of Ethernet switch or hub can be used but it should have at least 3 ports and be capable of operating on a 12 Volt DC power source. Examples of suitable switches include the NetGear GS105-Prosafe 5-port Gigabit Desktop Switch. Other manufacturers of suitable Ethernet switches include Linksys and 3Com.

Suitable antennas include any standard NMO 900 MHZ omni directional antenna for use with the Point-to-Point ISM Band radio. One example is the Atennex Model 12193-900 MHZ 3d Bi Black Phantom Antenna. Antennas with higher gains may be used to increase the distance between each of the components of the novel two component RF to IP Radio Bridge.

The battery utilized in at least one component of the two component bridge should be a 12 Volt rechargeable battery. Any type of lead acid battery can be used including a Lithium Ion battery to save weight. The battery should be capable of providing up to 5.4 Amps of current and preferably be rechargeable using solar cells. A suitable battery is the 271117-12 Volt 5.4 Amp/Hour Lead Acid Battery of Battery Kits Inc. As previously mentioned the outdoor component can be different than the indoor component and not even have a battery. The outdoor component could be mounted in an emergency response vehicle and use the battery power of the vehicle.

Other components include an On/Off switch, optional battery charger, optional solar cells, a multiple switch array, optional voltage monitor, an optional charge controller, optional high gain external antenna, optional adaptors for various types of licensed portable two-way radios in use or alternatively a built-in FCC licensed two-way radio. Other optional items include an AC/DC power switch, a Point-to-Pdint radio disconnect switch as well as LED indicator lights for various functions.

The components are preferably housed in a hard plastic case designed to be water resistant or water proof, shock proof and dust proof when closed. An example of a suitable case is the APP-1400E Pelican 1400 case manufactured by Pelican. Other cases include the Ameripack 6500 case. These cases are fitted with switches charging ports, RF portable radio communications ports, antennas, antenna ports, solar cells and indicator lights which preferably are LED lights to conserve battery power.

Additional components and embodiments of the invention including the description of the best mode will be discussed in relation to the accompanying figures which are included for purposes of illustrating the novel aspects of the invention and without limiting the invention.

BRIEF DESCRIPTION OF THE SEVERAL VIEWS OF THE DRAWING(S)

Additional embodiments, applications and components will be further described with reference to the accompanying drawings in the following Detailed Description of the Invention Including Best Mode. In order to facilitate the detailed description like reference numerals have been used to designate the same or similar components. The embodiments and components of the invention are illustrated by way of example and are not described for purposes of limiting the invention in which.

DETAILED DESCRIPTION OF THE INVENTION INCLUDING BEST MODE

Figure 3:
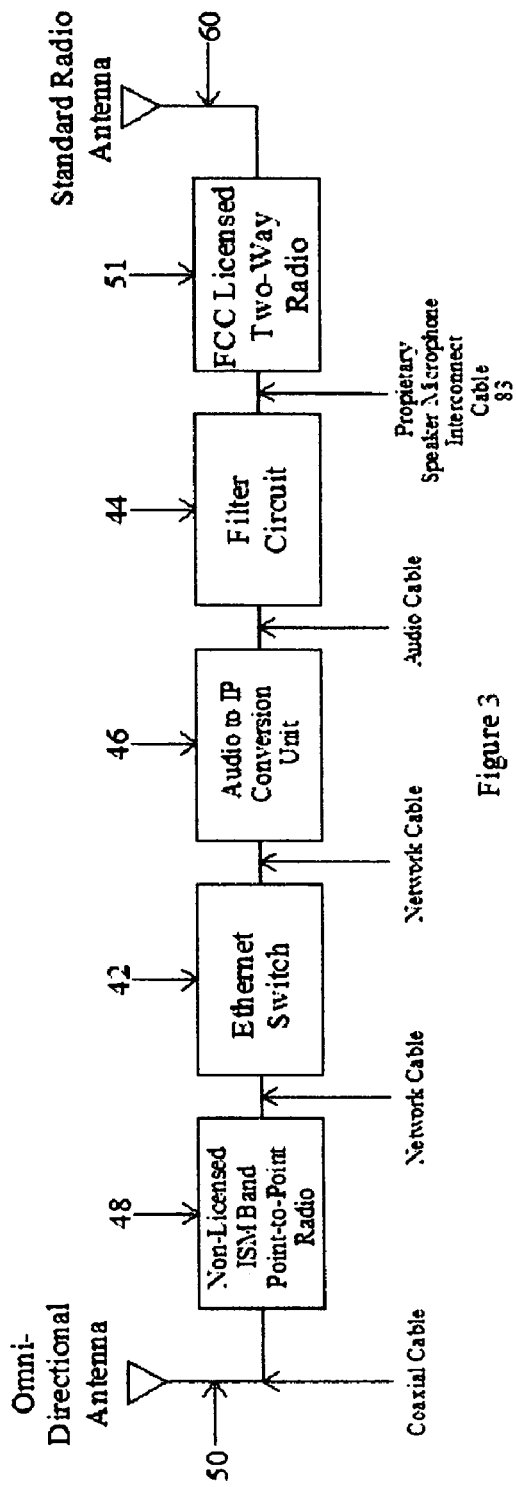
FIG. 3 is a diagrammatic view of the novel RF to IP Radio Bridge of the invention.
Figure 4:
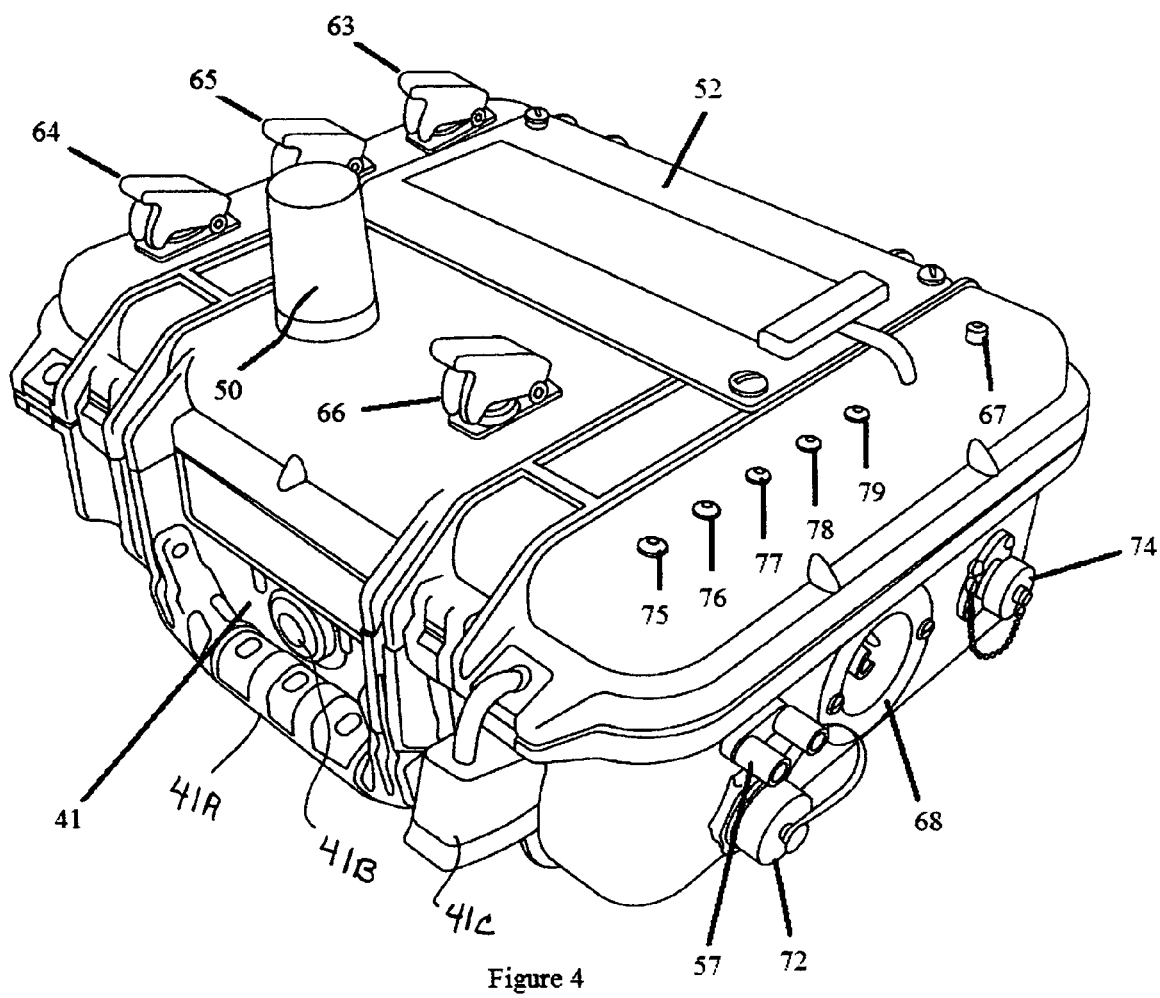
FIG. 4 is a perspective view of a housing constructed in accordance with the invention for housing the components of the invention.
Figure 9:
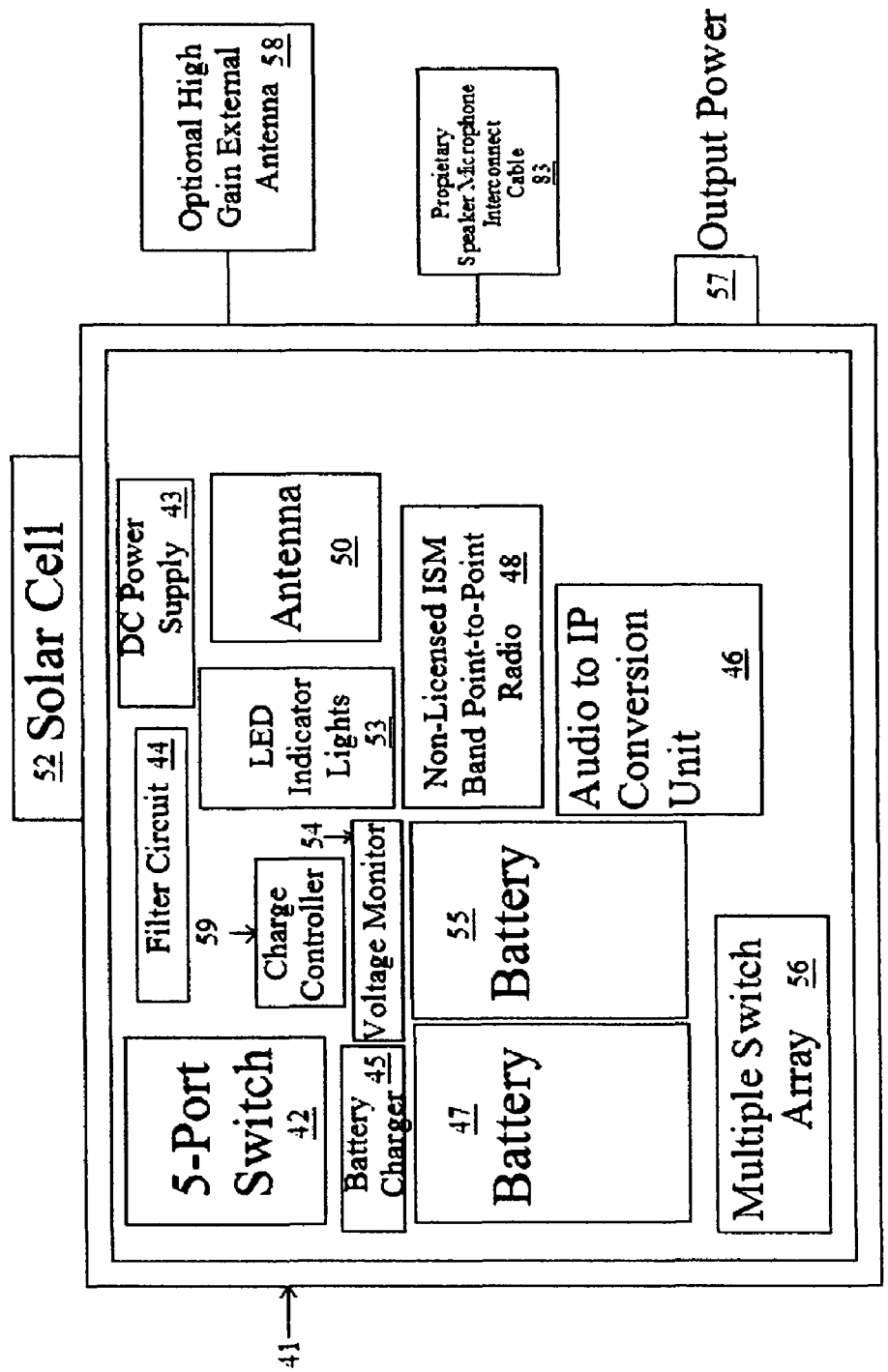
FIG. 9 is a block diagram illustrating the best mode embodiment of the RF to IP components in the housing.
Figure 11:
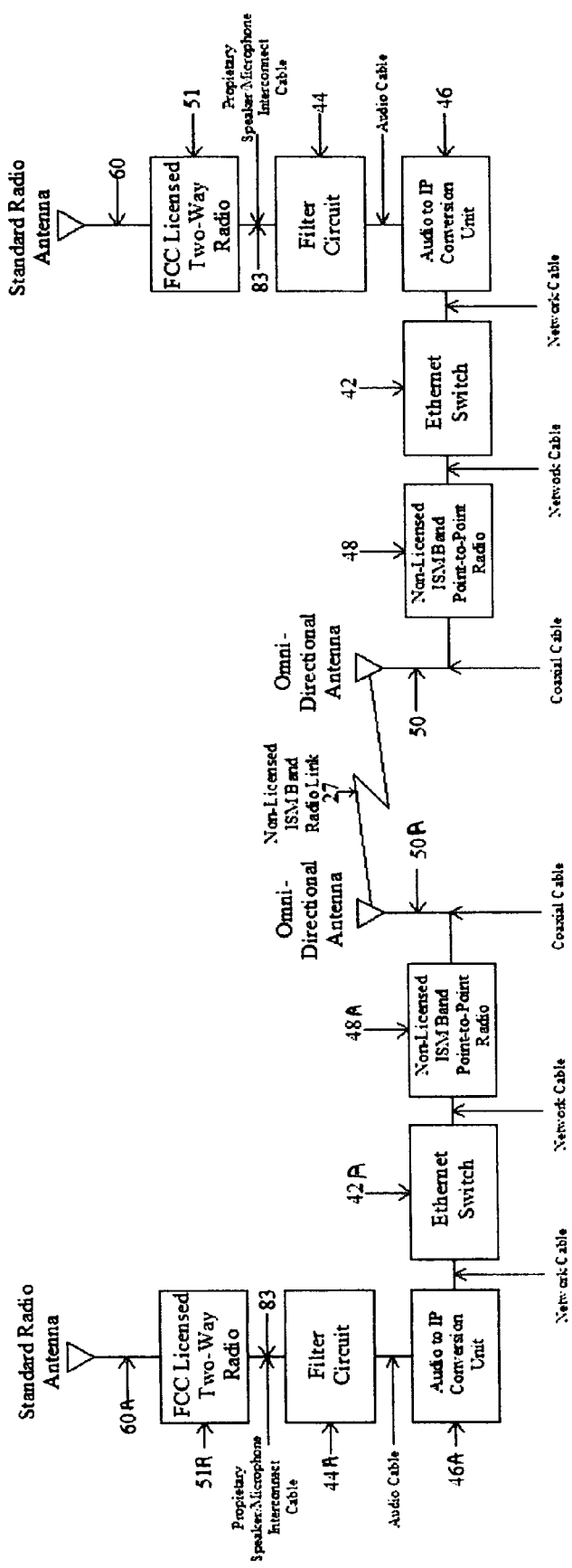
FIG. 11 is a block diagram of a complete bridge of a two component RF to IP Radio Bridge of the invention.
Figure 12:
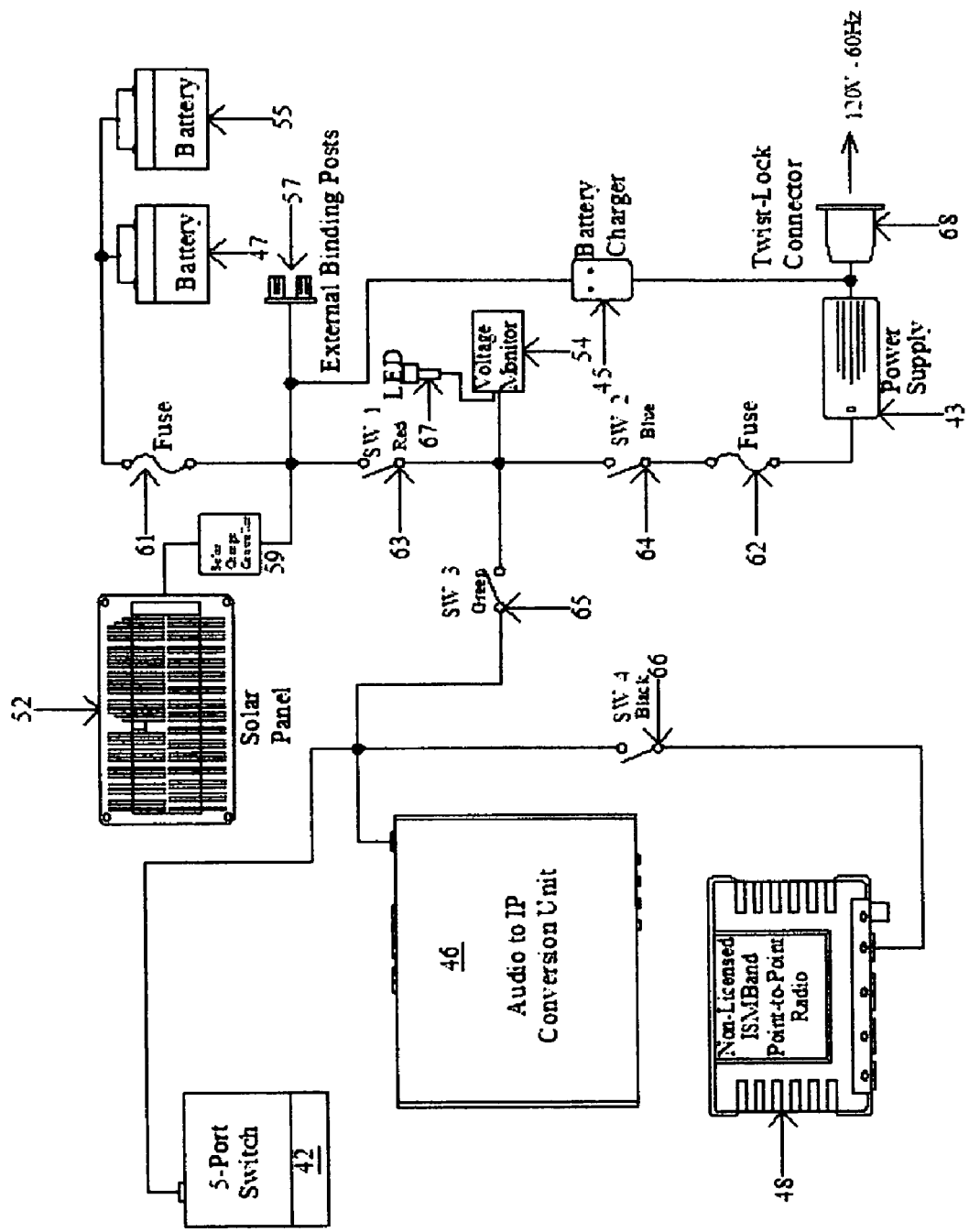
FIG. 12 is an electrical power diagram showing the connections between the components of the novel RF to IP Radio Bridge.
Figure 13:
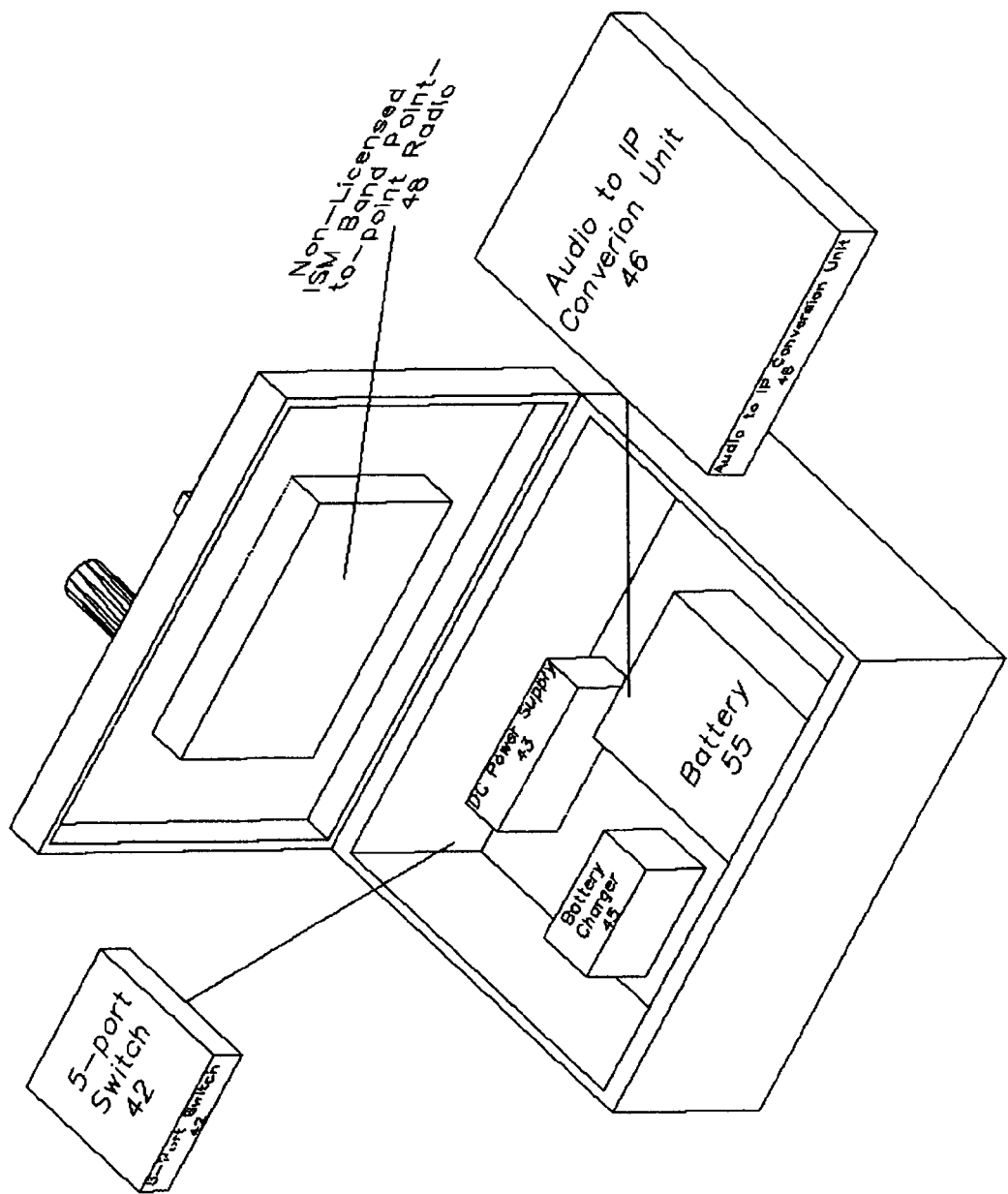
FIG. 13 is a front right side perspective exploded view of the components inside a housing in accordance with one embodiment of the invention.
Figure 14:
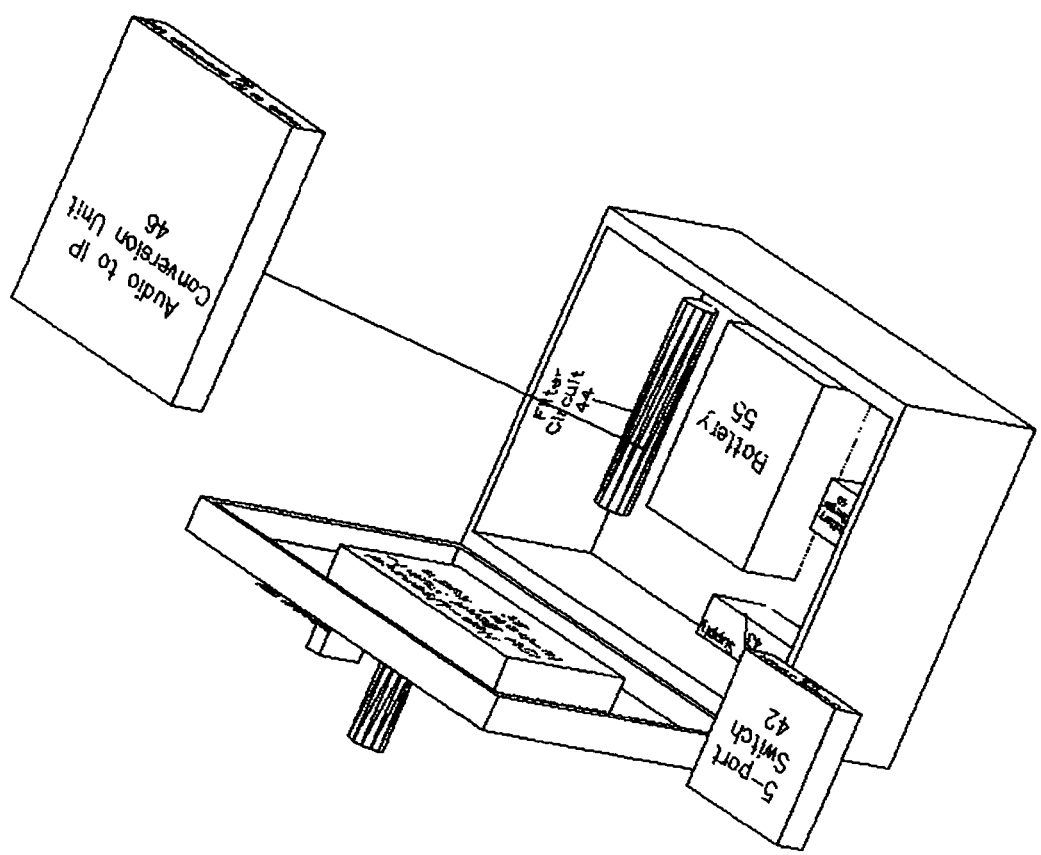
FIG. 14 is a front left side perspective exploded view of the embodiment in FIG. 13.
Figure 15:
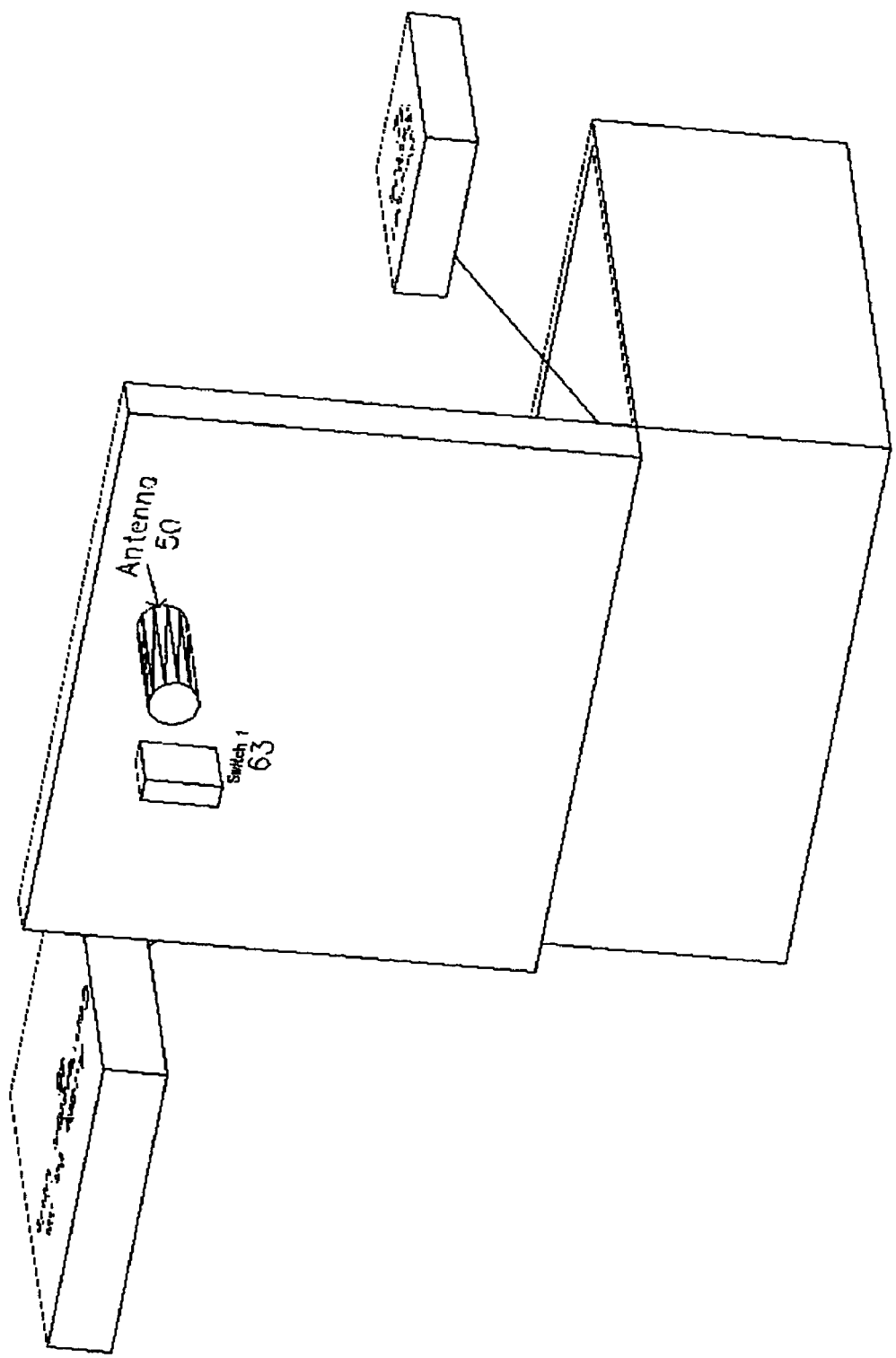
FIG. 15 is a rear side perspective exploded view of the embodiment in FIG. 13.
Figure 16:
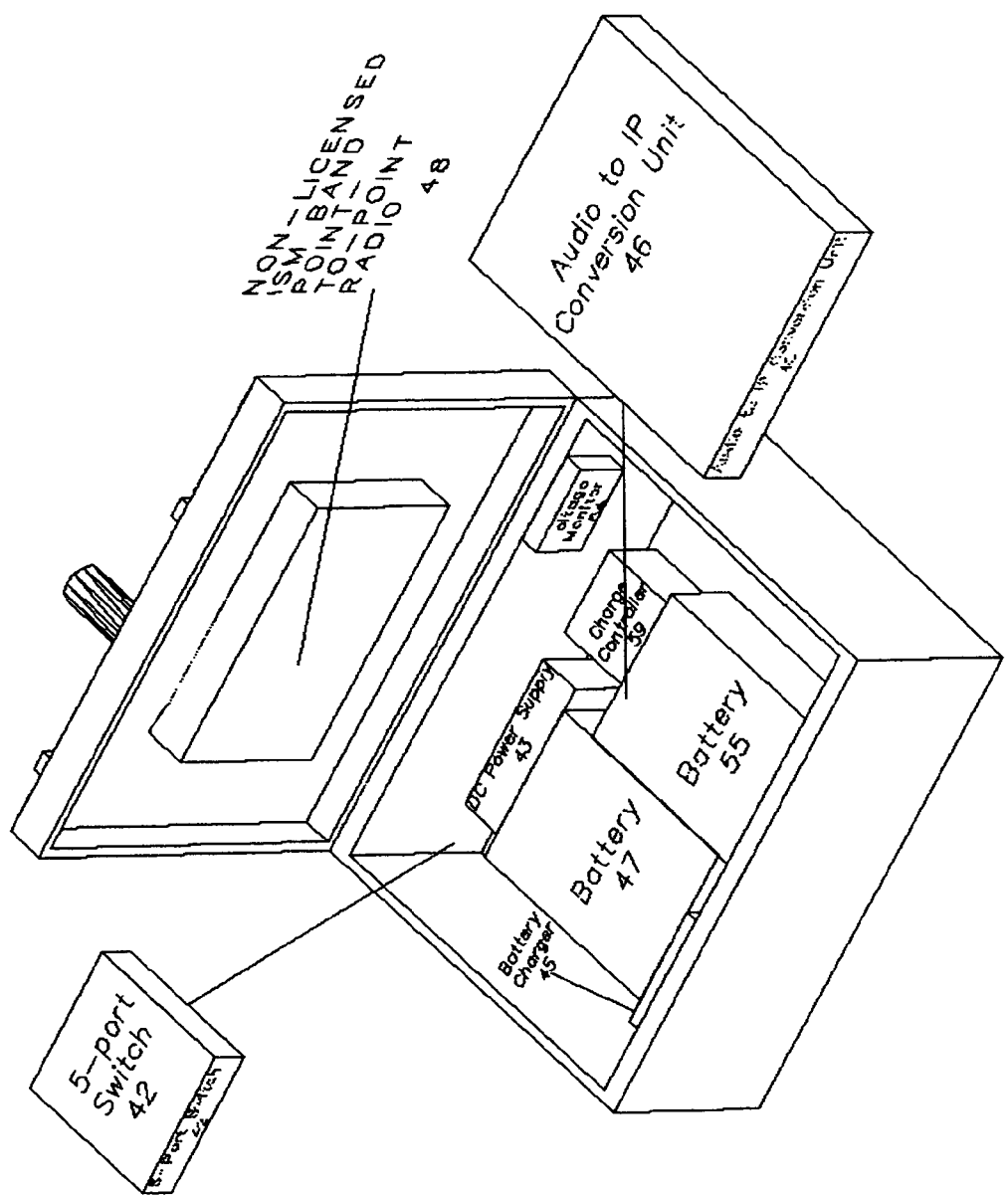
FIG. 16 is a right side perspective exploded view of the housing in accordance with the preferred embodiment of the invention.
Figure 17:
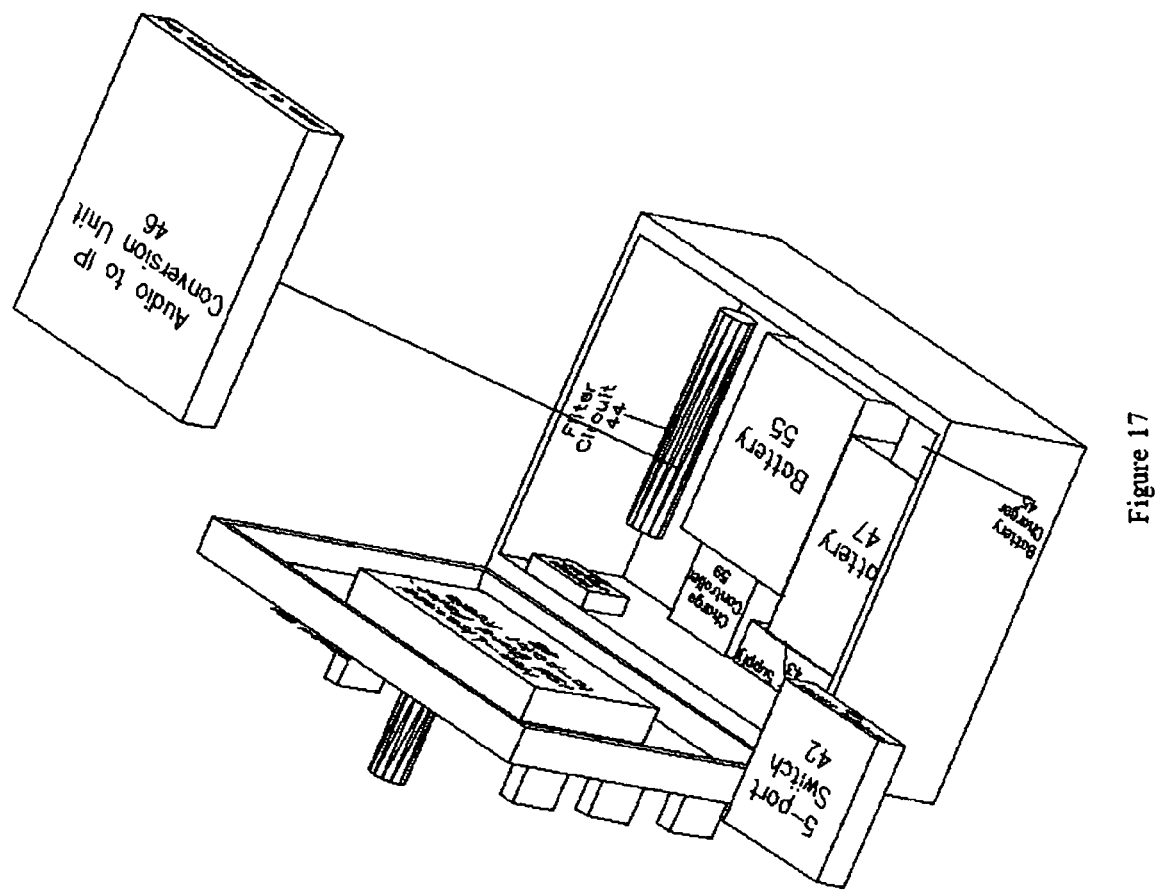
FIG. 17 is a front left side perspective exploded view of the embodiment in FIG. 16.
Figure 18:
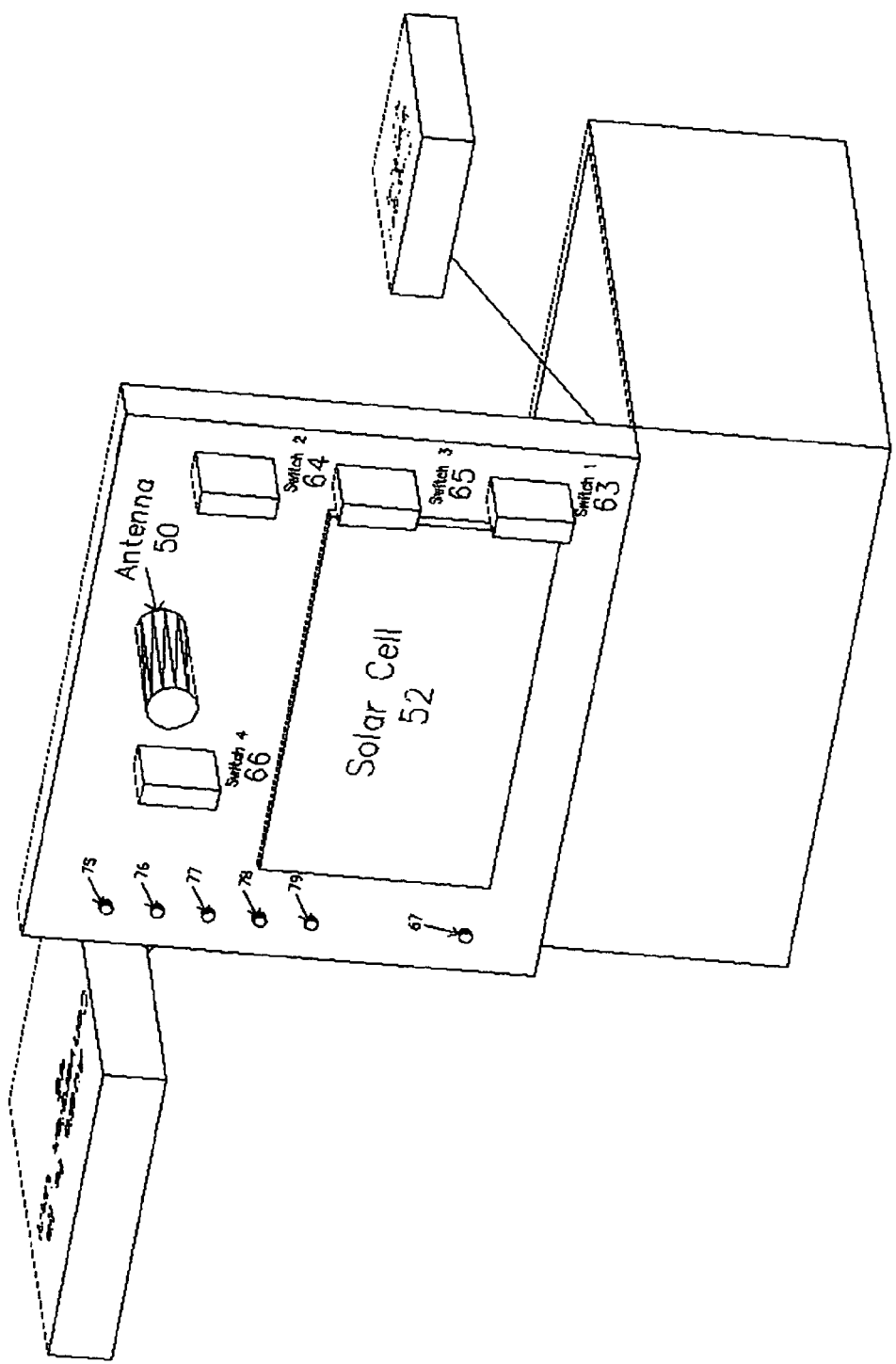
FIG. 18 is a rear side perspective exploded view of the embodiment in FIG. 16.

Referring now to FIGS. 3, 4, 9, 11, 16, 17 and 18 the best mode of the invention, system and components are illustrated. FIG. 3 diagrams the Audio signal conversion and data path in one of the novel components of the two component RF to IP Radio Bridge. FIG. 4 illustrates one of the components of the two component RF to IP Radio Bridges with the other component being of an identical shape, configuration, and layout. FIG. 9 schematically illustrates the components inside the RF to IP Radio Bridge of FIG. 4 and FIGS. 16, 17, 18 provide an exploded view of the components inside FIG. 4. FIG. 11 is like FIG. 3 except FIG. 11 diagrams the complete Audio signal conversions and data paths in the novel two component RF to IP Radio Bridge.

The RF to IP Radio Bridge Box includes a carrying case 41 that is preferably constructed of a water resistant or water proof material such as a high polymer durable plastic material that when closed is water resistant or water proof, shock proof and dust proof. Carrying case 41 includes a carrying handle 41A, a built in pressure relief valve 41B, and a padlock 41C or other type locking device for protecting the interior components.

Case 41 includes a built in antenna 50 which is a standard NMO mount 900 MHz omni directional antenna capable of receiving and transmitting on the ISM Band. Case 41 includes top mount switches 63, 64, 65 and 66 which are single pole single throw SPST switches covered by a safety cover.

Referring now to FIGS. 4, 9, 12 and FIGS. 16, 17 and 18 switch 63 applies power to the electronic components from the onboard batteries 47 and 55. Switch 63 is available to provide an alternative supply of AC power to be used to supply power to the electronic components.

Preferably switch 63 is red and sources the battery portion of the grid and makes it available for use by the electronics. The two gel-cell type 5.4 Amp/Hour batteries 47, 55 are wired in parallel to provide an 8 hour run time for the RF to IP Radio Bridge box.

The Solar Panel 52 will source approximately 150 mA through the Charge Controller 59 (FIG. 9) directly to the batteries at all times. Having the solar cell directly connected to the battery array 47, 55 allows them to be trickle charged at any time as long as some ambient light is available to the box. The charge controller 59 (FIG. 9) provides the additional benefit of a pulsed technology which desulfates and extends the life of the batteries. A pair of Binding Posts 57 provide output power which are connected directly to the batteries to facilitate connection of an external power source or to be used as a 12 Volt power source for other devices nearby in case of an emergency.

Switch 64 is preferably blue and sources the DC power supply portion of the grid and makes it available for use by the electronics. A 12 Volt 3.3 Amp DC Power Supply 43 (FIG. 9) provides electricity to power all components within the RF to IP Radio Bridge box should the battery system become depleted and an external 12 Volt power source is not available.

Switch 65 alternatively allows either an AC or DC power source to be utilized to supply power to the electronic components through a power plug port 68.

Switch 65 is preferably green and sources either the battery system or the DC power supply to the components within the RF to IP Radio Bridge box. It allows electricity to flow to both the 5-Port Switch 42 (FIG. 9) and the Audio to IP Conversion Unit 46.

Switch 66 is a disconnect switch to disconnect the Non licensed ISM Band Point-to-Point radio 48. This allows the novel RF to IP radio bridge to accommodate another type of wireless or wired network to be used as a link between the RF to IP Radio Bridge components. Switch 66 is preferably black and provides a cut-off switch for the Non-Licensed ISM Band Point-to-Point Radio 48. In the event the operator desires to use another network, wired or wireless, for data transmission between the RF to IP Radio Bridge boxes, switch 66 allows the operator to turn off the Point-to-Point radio while allowing the rest of the components to operate independently of it.

Case 41 also includes six Light Emitting Diodes or LED's 67, 75, 76, 77, 78 and 79. LED indicator light controller 53 (FIG. 11) connects LED 67 to voltage monitor 54 to indicate the status of batteries 47 and 55. LED 67 is designed to change color from green to orange to red to indicate the level of charge from good to poor.

LED 75 illuminates when switch 63 applies power to the Non Licensed ISM Band Point-to-Point Radio 48. LED 76 illuminates when an RF link is established between each of the Non Licensed Band Point-to-Point radios in case 41 and when an RF portable radio is properly attached to case 41 through connector 74.

Connector 74 is designed to connect via an adaptor to all RF portable radios in use by emergency responders. Connector 74 is a 4 pin twist lock jack and accepts associated portable two-way radios. A custom speaker/microphone cable mates with connector 74 and carries audio signals to and from the licensed two-way radio to the RF to IP Radio Bridge. When not in use the connector 74 is protected from the elements with a screw on cap.

LED 77 illuminates green when an Ethernet link is established between the audio to IP conversion units 46 in the case 41 inside a dead zone and a corresponding case 41 or unit outside the dead zone. As previously indicated both the inside and outside components of the novel two component bridge do not have to be identical since the outside of the dead zone unit could be a unit permanently or temporarily mounted to an outdoor rescue vehicle. However in the preferred embodiment and best mode both components of the novel two component RF to IP Radio Bridge are identical.

LED 78 illuminates green when a FCC licensed portable two-way voice radio inside or outside the dead zone communicates to the RF radio at either end of the novel two component bridge. LED 79 illuminates while audio traffic is transversing the link between the two components of the novel RF to IP communications bridge.

Case 41 also includes a pair of Binding Posts 57 to connect an external 12 Volt power source such as a vehicle's electrical system or a deep-cycle battery to extend total run-time of the RF to IP Radio Bridge box. The binding posts connect directly to the battery system on board and in an emergency they can also be used as a 12 Volt power source for other devices nearby.

An RJ-45 Category-5 jack 72 is included as a configuration port for the Audio to IP Conversion Unit and Non-Licensed ISM Band Point-to-Point Radio within the box. A computer is able to connect at this jack with a network cable and interface directly to the network components through the 5-Port Switch inside. When not in use, the jack is protected from the elements by a screw-on weather proof sealed cap. A commercial-grade 110 Volt AC Twist-Lock power connector 68 is for adding an extension cord to the RF to IP Radio Bridge box. Once the cord is plugged into a 110 Volt AC source, the box is capable of operating without the batteries through use of the on-board power supply. A battery charger is also wired to this power connector for charging the on-board battery system.

In the preferred embodiment and best mode of the invention a first case 41 and an identical second case 41 are used as inside and outside dead zone components of the novel two component RF to IP Radio Bridge. Each case 41 operates from its own 12 Volt DC power source. Each case inside and outside the dead zone uses approximately 750 mA current or 9 Watts of power. In the best mode and preferred embodiment a 12 Volt system was selected for compatibility with most standard DC electrical systems used in mobile emergency vehicles. The novel two component bridge can be configured to operate on 24 Volt, 6 Volt or other battery voltages. For example a 24 Volt system may be configured for helicopters, aircraft or other emergency response vehicles operating on a 24 Volt system.

Referring again to FIGS. 4 and 9 the multiple switch array 56 connects the four switches 63, 64, 65 and 66 on the case 41 to control power to the electronics inside. The color coding of each switch 63, 64, 65 and 66 as previously described is designed to assist an emergency responder in selecting a particular function of the novel two component RoIP Bridge. As a result once the color combinations are used repeatedly selecting the proper function is simplified by the application of ergonomics.

The novel system employing a two step RF signal to digital data packet and data flow is illustrated in FIGS. 3 and 11. FIG. 3 illustrates the RF signal to digital packet conversion in a single case 41 while FIG. 11 illustrates the complete RF to signal to digital packet conversion back to RF signal in the entire bridge using a component case 41 inside a dead zone and a component case 41 outside the dead zone.

Figure 8:
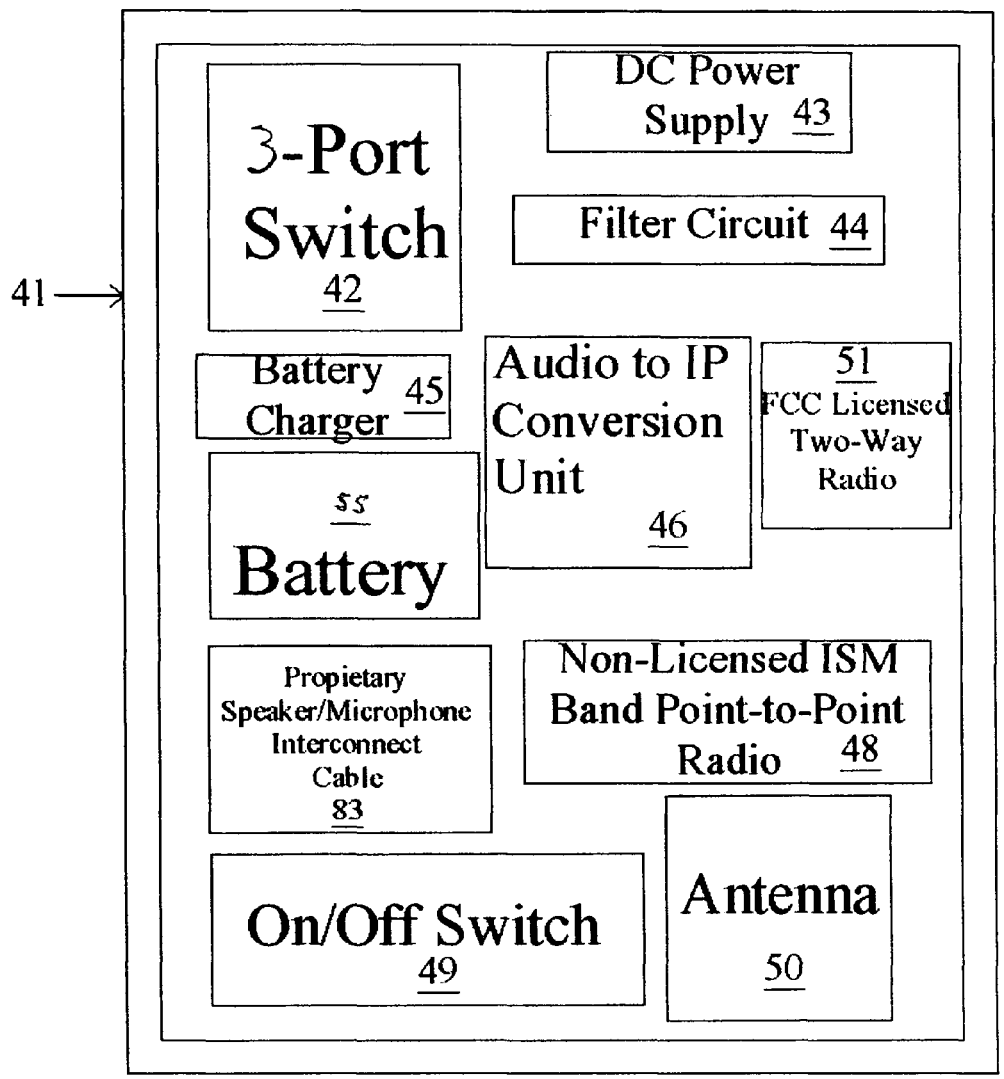
FIG. 8 is a block diagram similar to the embodiment of FIG. 7 with a built in two-way radio.
Figure 10:
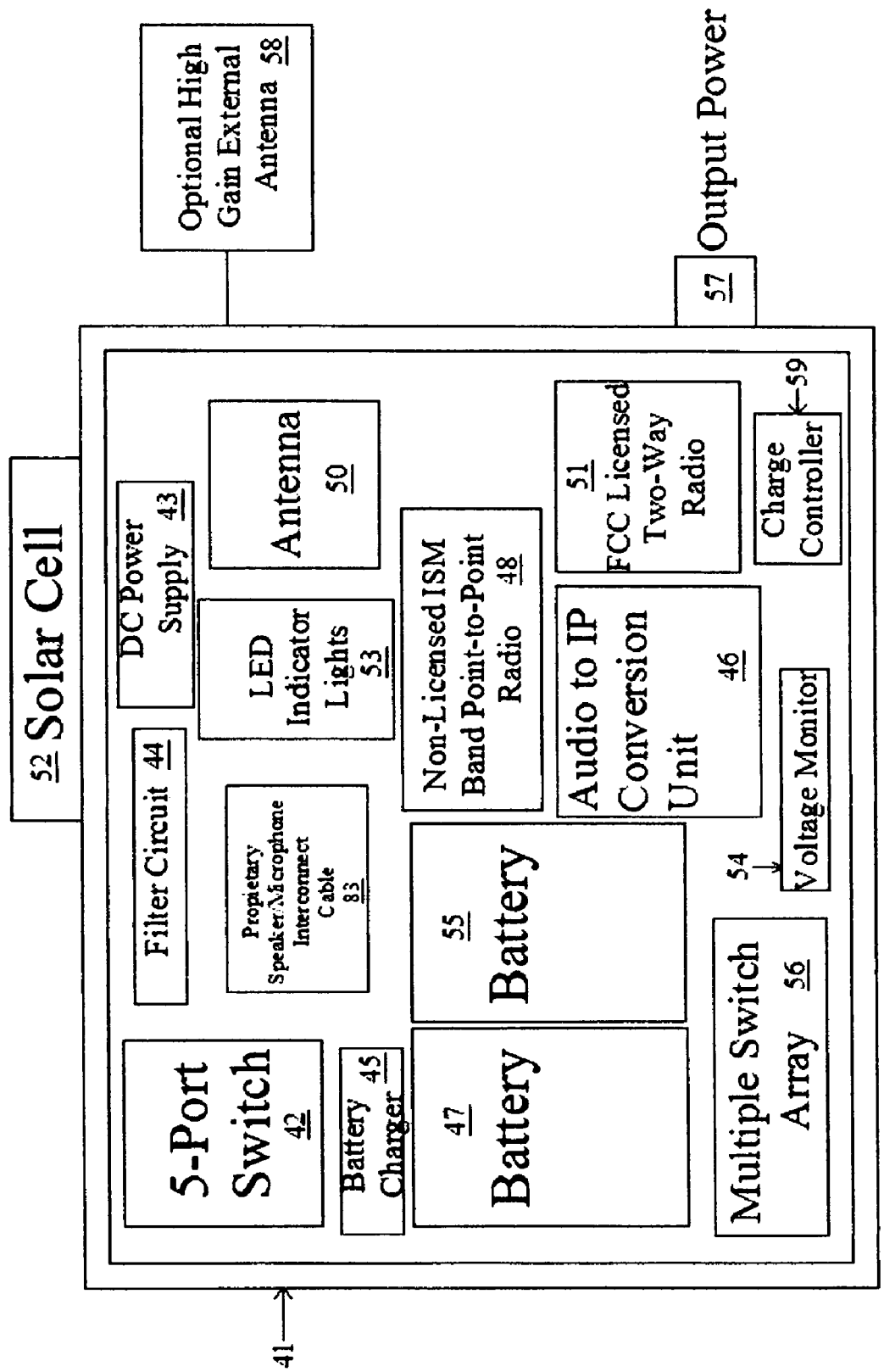
FIG. 10 is a block diagram similar to the best mode embodiment of FIG. 9 including a built in two-way radio.

An RF signal is received through antenna 60 which may be attached to a licensed FCC two-way portable radio 51 outside case 41 and plugged into jack 72 or when an RF licensed radio is included inside case 41 as illustrated in FIGS. 8 and 10. In the best mode a licensed FCC two-way portable radio is plugged into jack 72 in case 41 is preferred since it provides the advantages of ease of substitution of one radio for another and provides for compatibility through an adaptor for various brands of licensed FCC two-way radios.

Once a licensed FCC signal enters case 41 (FIGS. 3, 4 and 11) the audio signal passes through a filter circuit 44. Filter circuit 44 includes a network of capacitors, indicators and resistors. Filter circuit 44 can be obtained from Raytheon and is sold as an included component of the NXU-2A Radio over IP Network Extension Unit package which is used in the preferred embodiment and best mode of the invention.

After the audio is "cleaned up" in the filter circuit 44 it moves to the Audio to IP Conversion Unit 46. The Audio to IP conversion unit 46 converts audio and control tones from two-way radios into TCP/IP packet data using the Radio over IP (RoIP) protocol. The encoder is capable of five audio quality levels ranging from 13 kbps to 64 kbps of sustained available required bandwidth. The novel system is set to the 64 kbps level for transmitting the best possible audio quality.

The audio packet data is then sent through a wired or wireless Ethernet network to be received at the far end by the corresponding Audio to IP Conversion Unit and decoded back to standard audio. In the best mode the audio packet data is sent over a network cable to the 5-Port Switch 42 (FIG. 9). From the 5-Port switch the audio packet data is sent via a network cable to the Non-Licensed ISM Band Point-to-Point Radio 48. This data radio modulates the Ethernet traffic onto a 900 MHz, 2.4 GHz or 5.8 GHz ISM Band frequency and through a coaxial cable transmits it from the built-in omni-directional Antenna 50. Data throughput of the Point-to-Point radio varies from 512 kbps-1 Mbps dependent on distance and obstacles between the antennas. At the low end of the range, 512 kbps is plenty of available bandwidth to carry a 64 kbps voice signal.

Figure 20:
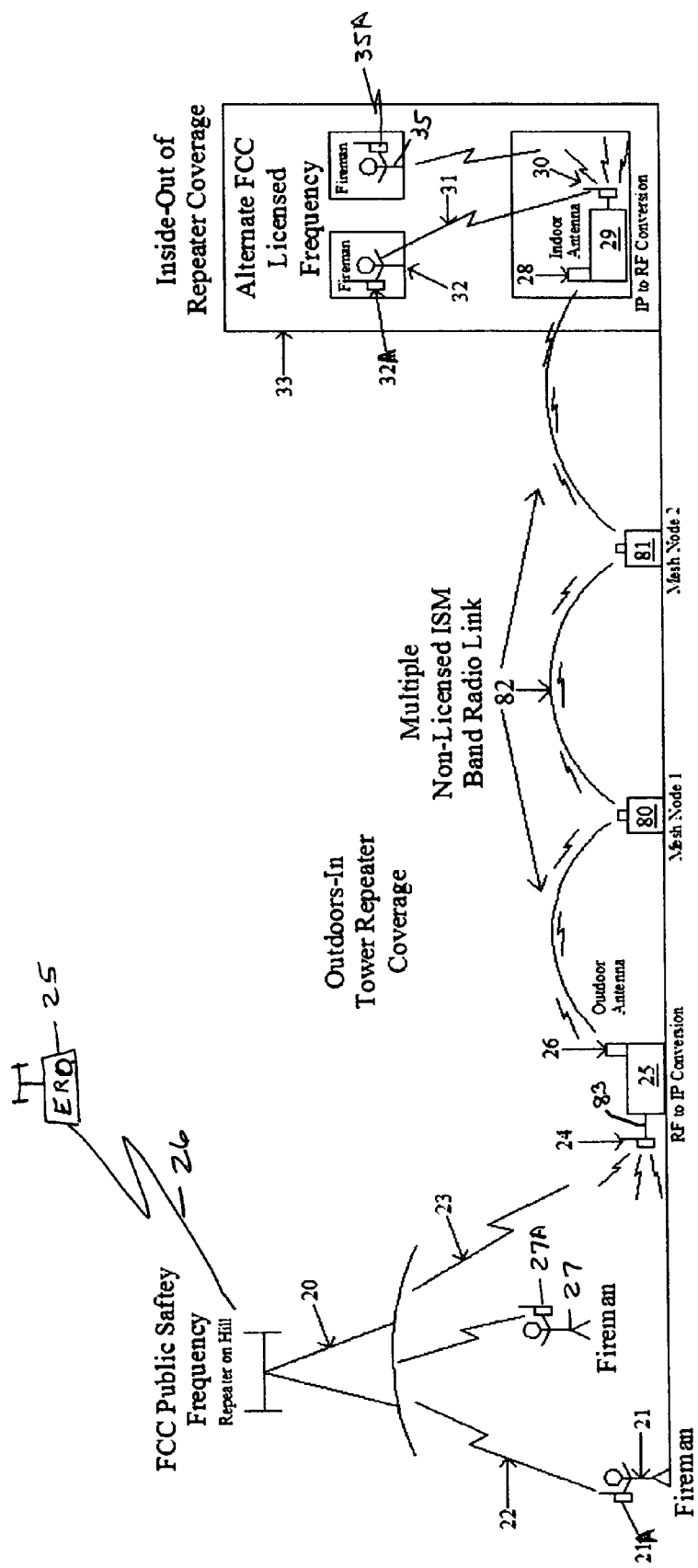
FIG. 20 is a diagrammatic view illustrating the addition of several mesh nodes to further increase the range of the novel RF to IP Radio to RF Radio Bridge.

The Non Licensed ISM Band Point-to-Point Radio 48 in the best mode is an iNET-II 900 MHz Point-to-Point Radio as manufactured by MDS. In accordance with an alternative embodiment of the invention ISM Band Point-to-Point Radio 48 could be any type of point-to-multipoint mesh enabled radio such as the AP 4000-M Mesh Enabled Access Point Radio. Any type of point-to-multipoint mesh enabled WiFi access point or router could also be used as an Ethernet interface such as Mesh Dynamics ME4350 Mesh Engine to provide a multi bridge chain linked network as illustrated in FIG. 20.

This unit is an 802.11a/b/g Access Point operating in the non-licensed ISM-bands. It is capable of sending standard TCP/IP data packets from one wireless access point to another using a "Mesh" architecture. A Mesh Network can be self-healing and rapidly expandable by adding additional access points to the system. AP's automatically associate with the nearest neighbor and create WiFi links between themselves. Should one unit fail, the system recognizes this and automatically compensates by routing traffic through another path Referring now to FIG. 11 once the audio packet data is transferred from inside case 41 through omni-directional antenna 50 it is received by omni-directional antenna 50A in the component case 41 inside the dead zone. The audio packet data received by corresponding Non Licensed ISM Band Radio 48A is routed to 5-Port Ethernet switch 42A and into the Audio to IP conversion unit 46A where the packet data is converted back to audio signals where it goes through filter circuit 44A and back into the FCC licensed two-way radio 51A to be transmitted through antenna 60A to other FCC licensed two-way radios held by emergency responders in the dead zone.

In operation a standard analog or digital portable two-way voice radio is connected to the RF to IP Radio Bridge box through the 4-Pin Twist-Lock Jack 74 (FIG. 4). The portable radio must have an external speaker/microphone jack for compatibility with this system. Almost any radio will work as long as the proper interconnect or adaptor cable 83 is used FIG. 5. The cables are custom manufactured per radio type. One end of the coiled cable will have a manufacturer's radio specific compatible external speaker/microphone connector. This component is specified per the RF radio manufacturer's standards since there is no industry standard (i.e. Motorola radios require Motorola adaptor cables manufactured for specific models.) The other end of the cable will have a universal 4-pin weather proof twist-lock adapter for connection to the jack 74 on the side of the RF to IP Radio Bridge box. The cable is comprised of four conductors and a grounding shield. One pair of conductors carry microphone signals while the other pair carry speaker signals to and from the portable two-way voice radio.

Figure 1:
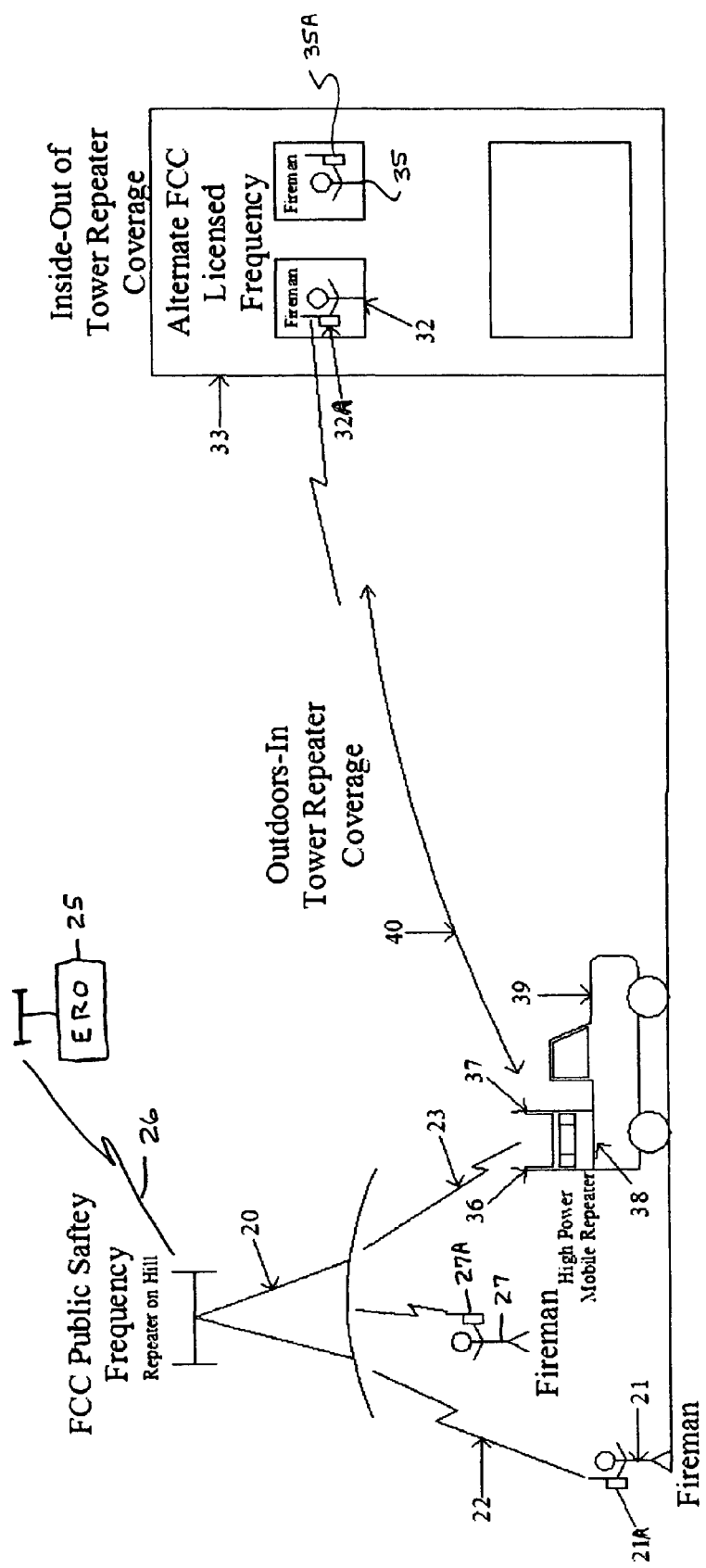
FIG. 1 is a diagrammatic view illustrating a prior art radio bridge.
Figure 2:
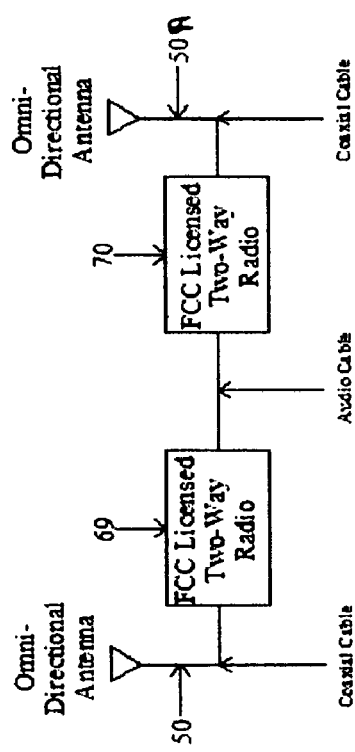
FIG. 2 is a diagrammatic view of a prior art mobile repeater.

The method of operation of the novel two component RF to IP radio bridge system will be described in greater detail with reference to FIGS. 4, 5 and 6. Unlike the prior art FIG. 1 a specially equipped emergency communications command vehicle having a high power mobile repeater 38 is unnecessary. Instead only two Ro to IP case 41 are required to set up a RF communications bridge to bridge dead zone 33 to the zone in RF radio communications with licensed radio repeater 20.

One novel RF to IP case 41 is set up outside dead zone 33. This RoIP case 41 will be referred to as RF to IP conversion unit 25 in FIGS. 5 and 6. An extra RF radio 24 is connected to unit 25 through an adaptor 83. Another RF to IP case 41 is set up inside dead zone 33 which will be referred to as indoor dead zone case 29 in FIGS. 5 and 6.

Indoor dead zone case 29 and outdoor case 25 may be identical to each other and case 41 of FIG. 4 or may be different as has heretofore been discussed. An RF radio 30 is attached to indoor dead zone case 29. The units are turned on and communications is provided through the novel two component RF to IP communications bridge.

A typical emergency scenario involves Emergency Response Personnel arriving on scene of a burning building. Firemen commence communication through their distant repeater 20 to ERO 25 via portable two-way voice radios 21A and 27A outdoors near the building. As several firemen 32 and 35 enter the building they soon realize their portable radios do not have enough transmit power to penetrate multiple walls, floors, and other structures in order to reach the public safety repeater located many miles away and they have entered a dead zone 33. Therefore personnel 32 and 35 inside the building having a dead zone 33 cannot communicate with personnel outside or with the dispatch center. CERMUSA solved this common problem with a portable light weight two-way radio communications RF to IP Radio Bridge System. Housed in two separate small, ruggedized, rapidly-deployable cases 41, the RF to IP Radio Bridge joins the communications gap from locations beyond coverage of a repeater due to terrain difficulties, foliage, structure walls, and depth below ground level, such as in tunnels or out at sea in stricken ships Once the outside case 25 and the inside case 29 are turned on emergency responder 21 keys up his portable two-way voice radio 21A and speaks. Voice is transmitted by signal 22 to a Public Safety Repeater 20 on a hill several miles away 20. The audio is received by the repeater 20 and is rebroadcast and carried by signal 23 to other emergency response worker 27 at the scene through his two-way radio 27A and also to portable two-way voice radio 24 connected to the "Outdoor" RF to IP Radio Bridge box 25. Signal 26 from repeater 20 connects ERO to the emergency scene.

The RF to IP Radio Bridge case 25 receives an audio signal 23 from the connected portable two-way voice radio 24 and converts it to TCP/IP packet data using the Radio over IP (RoIP) protocol. The packet data stream is wirelessly retransmitted by signal 27 from case 25 via a small built-in omni-directional antenna 26 to the corresponding small built in omni-directional antenna 28 in case 29 inside dead zone 33. The RF to IP Radio Bridge case 29 is placed somewhere in the building by an emergency rescuer on his way in. The small built-in omni-directional antenna 28 of case 29 receives this transmission and passes it along to the electronics within the box housed by case 29. An IP to RF conversion takes place inside case 29. The TCP/IP packet data is re-converted back to audio using the RoIP protocol. The audio is sent from RF to IP Radio Bridge case 29 to the connected portable two-way voice radio 30 where it is rebroadcast as signals 31 on a separate simplex channel within the dead zone 33. The emergency rescuer 32 and emergency rescuer 35 within dead zone 33 that have their radios tuned to the simplex channel receive the audio in their portable two-way radios 32A and 35A respectively from the rescuers 21 or 27 or through ERO 25 through the RF to IP Radio Bridge System.

The system works the same way in both directions. Audio can be sent from radios within the dead zone and received by radios outdoors. Emergency workers within the structure out of repeater coverage are now able to communicate with the dispatch center and any personnel outside who are within repeater coverage and vice versa.

Allowable distance for the Non-Licensed ISM Band Radio Link signal 27 varies depending on a number of factors that will invariably be different at every scenario where the boxes are deployed. Throughout several tests performed with the system after construction, CERMUSA has found the system functions reliably at distances up to approximately 50 yards and that upgrades to the novel RF to IP Radio Bridge as will be discussed further with reference to FIGS. 6 and 20.

Figure 5:
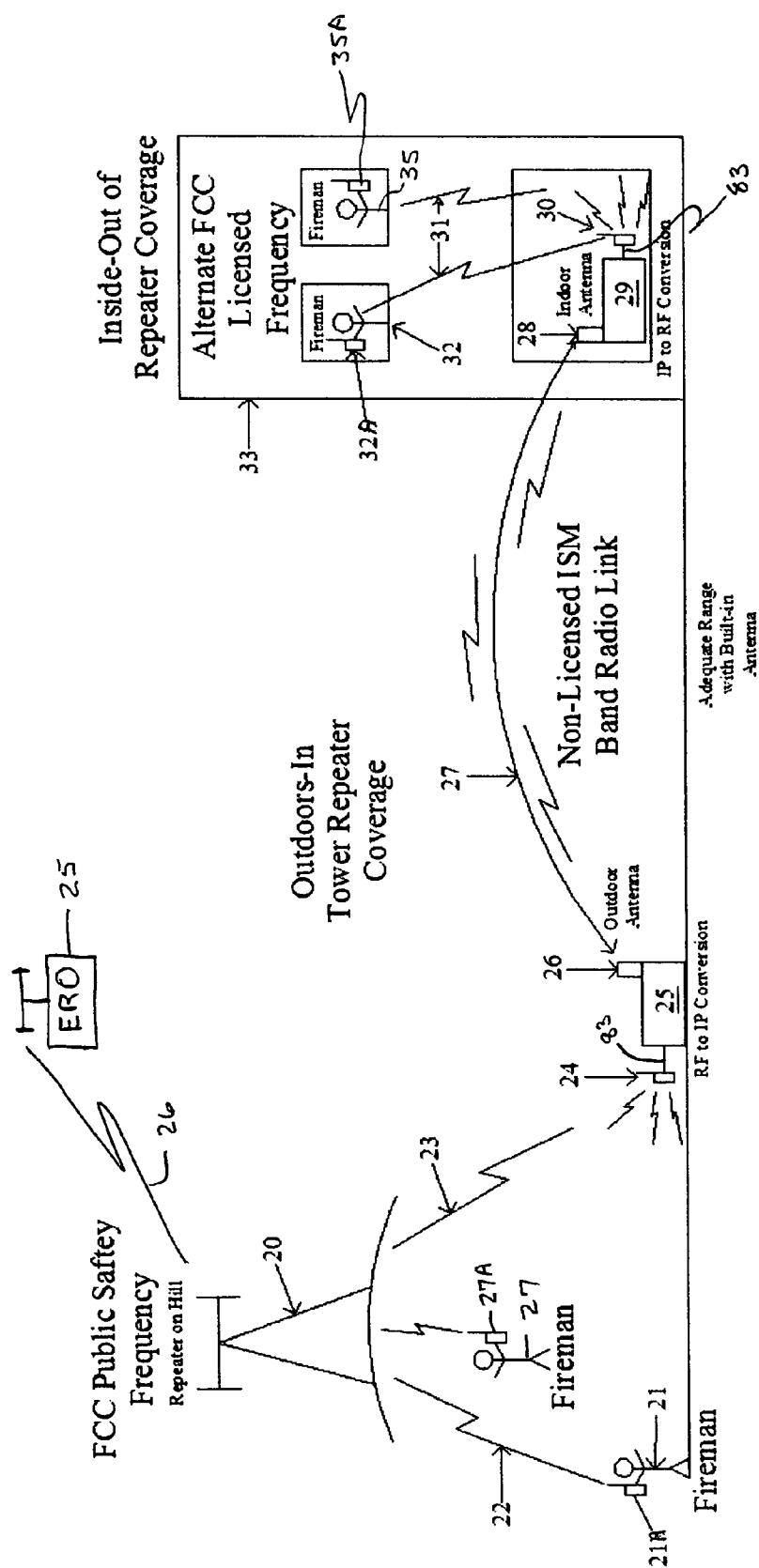
FIG. 5 is a diagrammatic view illustrating one application of the novel RF to IP Radio Bridge.
Figure 6:
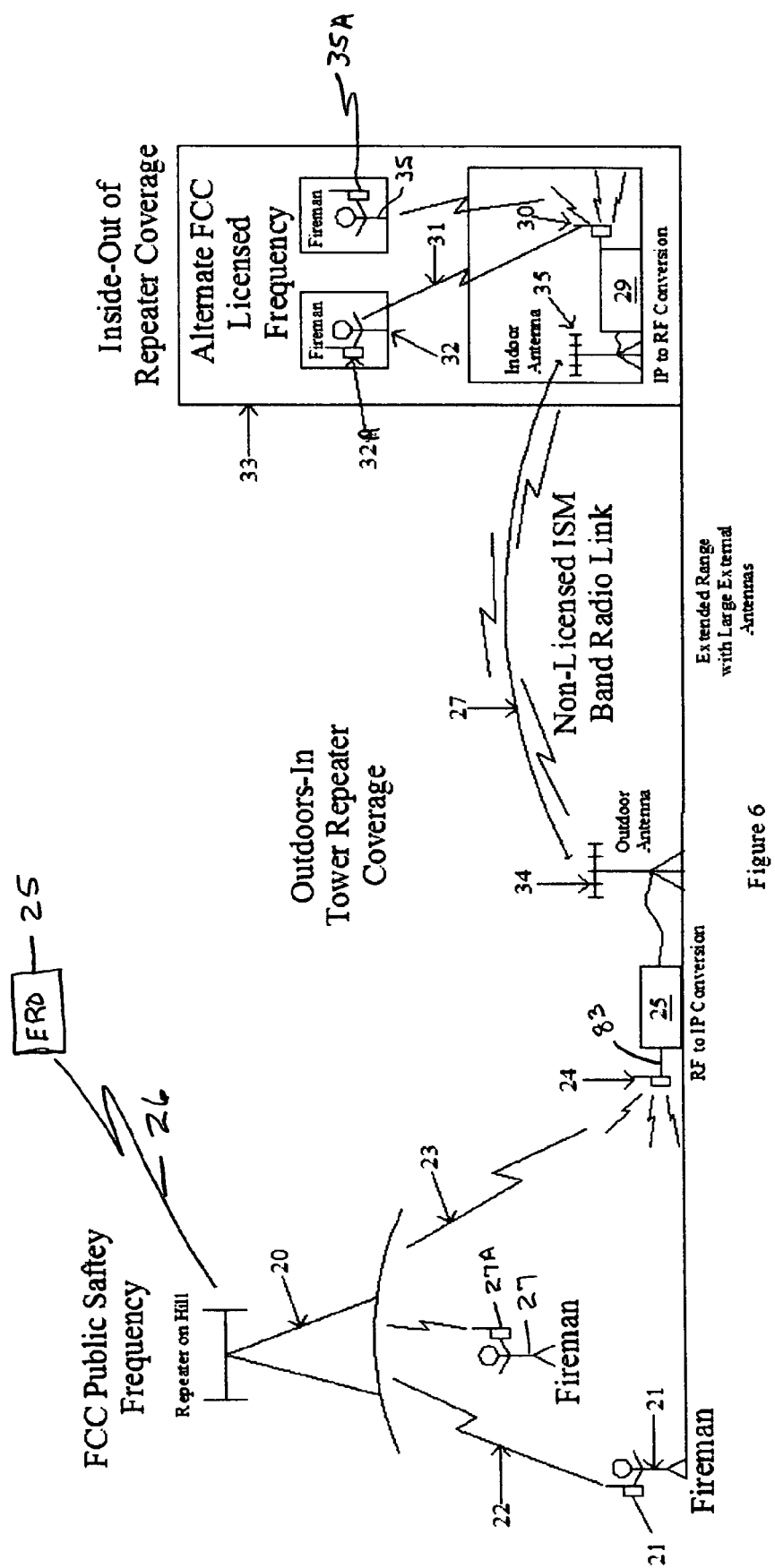
FIG. 6 is a diagrammatic view similar to FIG. 5 illustrating an alternative embodiment of the invention utilizing higher gain antennas.

Referring now to FIG. 6 the same discussion with respect to FIG. 5 is applicable. The only difference is that in FIG. 6 an upgrade has been added to the RF to IP Radio Bridge of FIG. 5. In FIG. 6 the RF to IP Radio Bridge System utilizes large, high-gain external antennas 34 and 35 to replace the small, built-in omni-directional units (FIG. 6). The large antennas provide greater range and more penetrating ability of the system.

Referring now to FIG. 20 a further embodiment for extending the range of the novel RF to IP Radio Bridge is illustrated. In this embodiment a Cat-5 network cable can be attached to Jack 72 (FIG. 4) to connect the novel RF to IP Radio Bridge case 25 to another wired or wireless network if the internal Non Licensed ISM Band Point-to-Point radio is not used. Alternatively both wired and wireless links may be used to interconnect a mesh node 80 to a further mesh node 81 or any number of additional mesh nodes.

FIG. 20 illustrates a wireless connection between case 25 and mesh node 80. A further wireless link is provided between mesh node 81 and case 29 inside dead zone 33. The novel RF to IP Radio Bridge boxes are adaptable and accommodate any form of mesh topologies.

Figure 19:
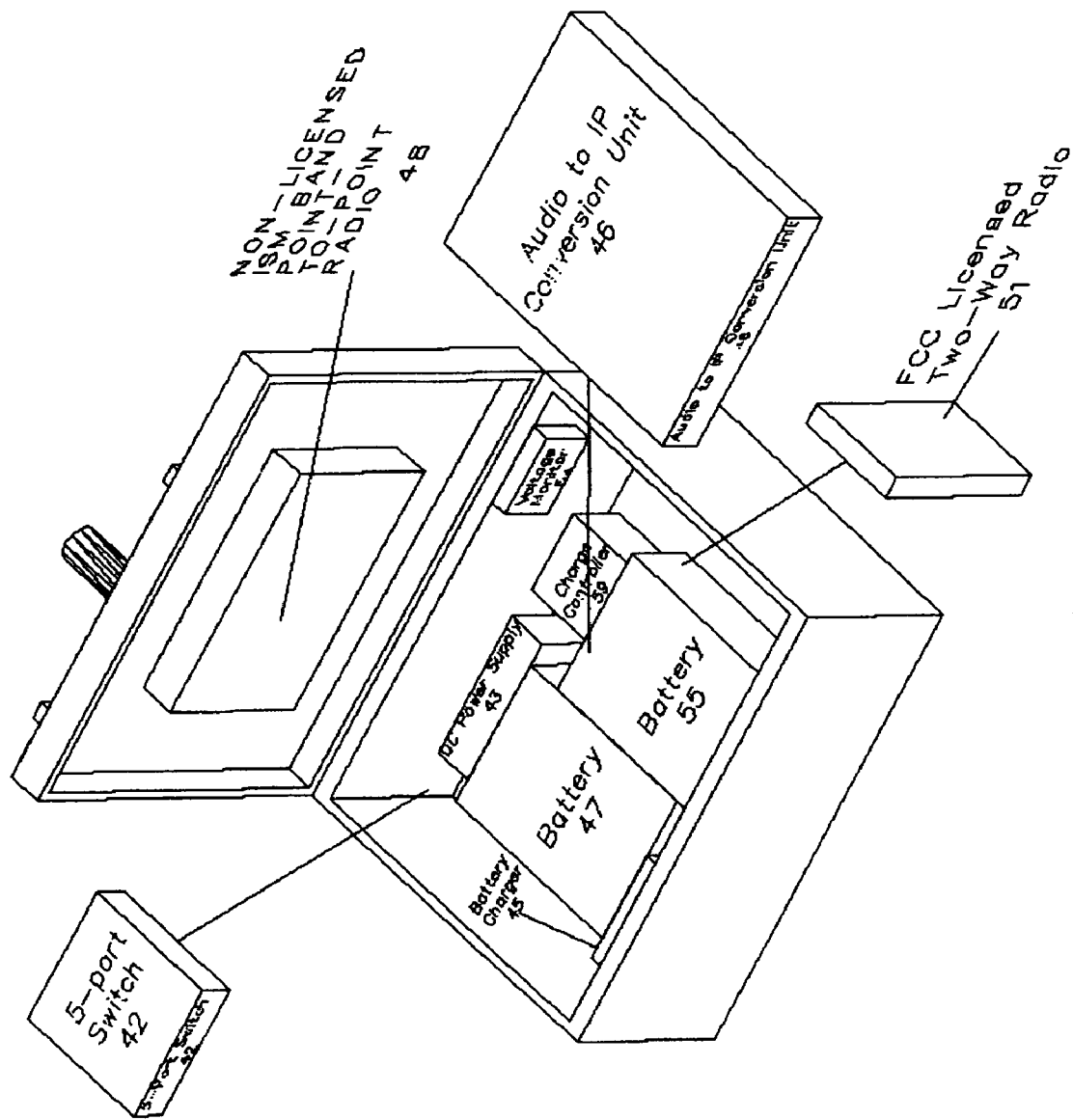
FIG. 19 is a front right side perspective exploded view with a further embodiment of the novel RF to IP Radio Bridge with a built in FCC licensed two-way radio.

The components of the novel RF to IP Radio Bridge have been described and illustrated in FIGS. 4, 9, 11, 12, 16, 17, and 18. This invention however may be modified in many ways to suit particular applications. For example the embodiment illustrated in FIGS. 10 and 19 uses the same components except for the addition of built in RF licensed two-way Radio 51. The addition of a licensed RF two-way radio to case 41 in one or both components of the two component bridge eliminates the requirement of connecting an RF radio 24 and 30 (FIG. 5) and eliminates an RF portable radio connector and adaptor at both ends of the novel two component bridge.

The novel RF to IP Radio Bridge may also be modified by reducing the number of components in case 41. The reduction of components as will be recognized by those skilled in the art depends upon the implementation of the invention.

For example while in the best mode and preferred embodiment case 41 and the electronic components are identical at both ends of the novel two component RF to IP Radio Bridge, there may be applications where it is desirable to have different components. In such an embodiment the outside of the dead zone component might be installed in a fire truck, ambulance, aircraft or other such emergency vehicle which could be adapted for inclusion in a mesh node as heretofore discussed. When one component is installed in a vehicle the outdoor component could eliminate battery 47 and battery charger 45 and instead rely solely upon the emergency vehicle's battery and battery charger.

Figure 7:
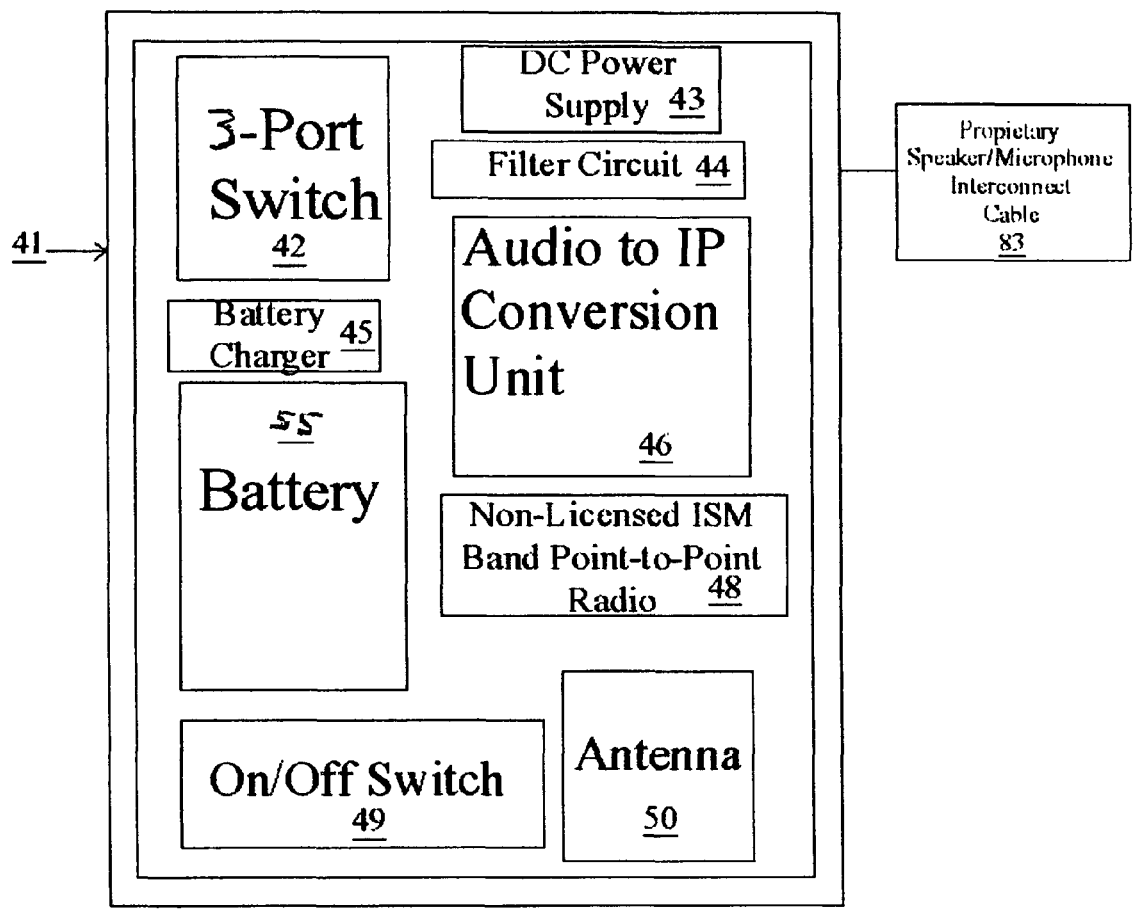
FIG. 7 is a block diagram of one embodiment of the RF to IP components inside a housing.

Other embodiments and applications of the invention include utilizing a two component RF to IP Radio Bridge of lighter weight by eliminating battery 47 as illustrated in FIG. 7. In addition other components can be eliminated to reduce cost and weight.

Referring now to FIGS. 7, 13, 14 and 15 a lighter weight and lower cost embodiment of the novel RF to IP Radio Bridge is illustrated. In this embodiment battery 55 is removed and charge controller 59, voltage monitor and LED lights and LED lights indicator are removed. This embodiment of the invention includes a single ON-OFF switch 63 and operates in the same manner as the embodiment of the best mode except for more limited battery life and less available function than the RF to IP Radio Bridge of the best mode and less capabilities as a result of the use of a 3 port Ethernet switch 42 rather than the 5 port switch 42 of the preferred embodiment.

The lighter weight and lower cost embodiment of the invention can also be constructed to include a built in FCC licensed two-way radio as illustrated in FIG. 8. FIG. 8 operates in the same manner as FIG. 7 except for the elimination of the requirement of connecting an RF portable radio 24 and 30 (FIG. 5), an RF radio connector and adaptor at both ends of the novel two component RF Radio to IP Bridge.

As previously discussed the invention can be implemented and modified in a number of different ways by those skilled in the art. The components of the novel RF Radio to IP Bridge may be modified to include inexpensive versions to sophisticated versions including various features and peripherals.

The invention may also be modified by those skilled in the art so that the component for deployment in a dead zone is different than the component outside the dead zone. The component for deployment outside the dead zone may also be installed in an emergency response vehicle as previously discussed.

These and other such modifications of the invention by those skilled in the art are to be treated as within the scope of the appended claims.

As used herein and in the following claims, the word 'comprising' or 'comprises' is used in its technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims:

What is claimed is:

1. A multi-radio bridge comprising:
   (a) a first component and a second component and a transmission means linking said first component and said second component wherein said first component and said second component are not in the same unit;

(b) a first input for receiving and transmitting an RF audio signal in said first component wherein said first input has at least a two wire conductive cable;

(c) a first audio to IP conversion unit in said first component wherein said first audio to IP conversion unit converts and reconverts audio to IP or IP to audio;

(d) a first Non licensed ISM Band transceiver disposed in said first component;

(e) a second input for receiving and transmitting an RF audio signal in said second component wherein said second input has at least a two wire conductive cable;

(f) a second audio to IP conversion unit in said second component wherein said second audio to IP conversion unit converts and reconverts audio to IP or IP to audio; and (g) a second Non licensed ISM Band Transceiver disposed in said second component.

2. The multi-radio bridge of claim 1 wherein said first component or said second component includes a battery.

3. The multi-radio bridge of claim 1 wherein said first component or said second component includes a battery charger.

4. The multi-radio bridge of claim 1 wherein said first component or said second component includes a solar cell panel.

5. The multi-radio bridge of claim 1 wherein said first component or said second component includes an FCC licensed two-way radio.

6. The multi-radio bridge of claim 1 wherein said first component or said second component include an adaptor connecting said first input for receiving and transmitting the RF signal with a portable hand held two-way radio.

7. The multi-radio bridge of claim 1 wherein said first component or said second component is housed in a portable carrying case with a handle.

8. The multi-radio bridge of claim 7 wherein said housing includes an Ethernet switch having at least three ports.

9. The multi-radio bridge of claim 7 wherein said housing includes an antenna.

10. The multi-radio bridge of claim 7 wherein said housing includes a filter circuit.

11. The multi-radio bridge of claim 10 wherein said housing includes an ON-OFF switch and a battery charger.

12. The multi-radio bridge of claim 7 wherein said Ethernet switch is a 5 port switch.

13. The multi-radio bridge of claim 12 wherein said first component and said second component include the same electronic components.

14. The multi-radio bridge of claim 13 wherein said first component and said second component include a battery, a battery charger, a voltage monitor, a charge controller and a multiple switch array.

15. The multi-radio bridge of claim 14 wherein said portable case is constructed of a high polymer plastic material and is water resistant, shock proof and dust proof when closed over said electronic components.

16. The multi-radio bridge of claim 15 wherein said portable case includes a solar cell disposed on the outside of said portable case and LED indicator lights and switches.

17. The multi-radio bridge of claim 7 wherein said first component or said second component includes an FCC Licensed two-way radio.

18. A telecommunications system for bridging RF signals into a dead zone comprising:

(a) a first input for transmitting and receiving an audio signal in an area of RF communications coverage wherein said first input has at least a two wire conductive cable;

(b) a first device for converting and reconverting an audio signal to a TCP/IP digital packet wherein said first device receives an audio signal and converts and reconverts the audio signal into Ethernet packet data;

(c) a first unlicensed ISM Band transceiver disposed in said area of RF communications coverage;

(d) a second unlicensed ISM Band transceiver disposed in a dead zone said dead zone being an area where one RF radio repeater to extend coverage into an area inaccessible or poorly covered by licensed radio repeaters;

(e) a second device for converting and reconverting an audio signal to a TCP/IP digital protocol disposed in said dead zone wherein said second device receives an audio signal and converts and reconverts the audio signal into Ethernet packet data; and (f) a second input for transmitting and receiving an audio signal disposed in said dead zone outside said area of RF communications coverage wherein said second input has at least a two wire conductive cable.

19. The telecommunications system of claim 18 wherein Said second input for transmitting and receiving said audio signal, said second device for converting and reconverting said audio signal and said second unlicensed ISM Band Transceiver are disposed in a portable carrying case.

20. The telecommunications system of claim 19 wherein said first input for transmitting and receiving an audio signal, said first device for converting and reconverting said audio signal and said first unlicensed ISM Band transceiver are installed in an emergency response vehicle.

21. The telecommunications system of claim 19 wherein said first input for transmitting and receiving said audio signal, said first device for converting and reconverting said audio signal and said first unlicensed ISM Band transceiver are disposed in a second portable carrying case.

22. The telecommunications system of claim 21 wherein said portable carrying case and said second portable carrying case are identical.

23. The telecommunications system of claim 22 wherein said portable carrying case includes a built-in antenna, a solar cell panel, a battery and a battery charger.

24. The telecommunications system of claim 23 wherein said portable carrying case includes a built-in FCC licensed two-way radio.

25. A portable RF to IP communications bridge component comprising:

(a) a first input for receiving and transmitting an audio signal in a first unit, said first input receiving an input signal from at least a two wire conductive cable;

(b) a first audio to IP conversion unit communicating with said first input said first audio to IP conversion unit receiving an audio signal from said first input and converting and reconverting the audio signal into TCP/IP packet data in said first unit;

(c) a first Non licensed ISM Band transceiver in said first unit communicating with said first audio to IP conversion unit for wireless communication with a second Non Licensed ISM Band transceiver;

(d) a second Non licensed ISM Band transceiver communicating with a second audio to IP conversion unit in a second unit for wireless communication with said first Non licensed ISM Band transceiver in said first unit;

(e) a second input for receiving and transmitting an audio signal in said second unit, said second input receiving an input signal from at least a two wire conductive cable; and (f) an Ethernet switch having at least three ports in said first unit to connect said first audio to IP conversion unit and said first Non licensed ISM Band transceiver.

26. The portable RF to IP communications bridge of claim 25 further comprising a portable case to house electronic components.

27. The portable RF to IP communications bridge of claim 26 wherein said input for receiving and transmitting the audio signal is a two-way radio jack disposed in said portable case.

28. The portable RF to IP communications bridge of claim 27 wherein said Ethernet switch has five ports.

29. The portable RF to IP communications bridge of claim 28 wherein said portable case has a built-in antenna communicating with said first Non licensed ISM Band transceiver.

30. The portable RF to IP communications bridge of claim 28 wherein said first Non licensed ISM Band transceiver has a data rate of at least 512 kbps.

31. The portable RF to IP communications bridge of claim 28 further comprising a battery.

32. The portable RF to IP communications bridge of claim 31 further comprising a battery charger.

33. The portable RF to IP communications bridge of claim 32 further comprising a charge controller.

34. The portable RF to IP communications bridge of claim 33 further comprising a multiple switch array.

35. The portable RF to IP communications bridge of claim 34 further comprising a voltage monitor.

36. The portable RF to IP communications bridge of claim 35 further comprising a solar cell.

37. The portable RF to IP communications bridge of claim 36 further comprising LED indicator lights.

38. The portable RF to IP communications bridge of claim 37 further comprising an output power outlet.

39. The portable RF to IP communications bridge of claim 25 wherein said first Non Licensed ISM Band transceiver is a point-to-multi-point mesh transceiver.

40. A method of providing RF communications in a dead zone comprising the steps of:

(a) utilizing an RF radio signal in an area having RF communications coverage by obtaining an audio signal from said RF radio signal;

(b) converting or reconverting said audio signal to a TCP/IP digitized data packet;

(c) transmitting or receiving said converted or reconverted TCP/IP digitized data packet from said area having RF communications coverage to a dead zone using a first unlicensed ISM transceiver wherein said steps of utilizing, converting or reconverting and transmitting or receiving are performed in a first device of a system having at least two separate devices;

(d) receiving or transmitting said converted or reconverted TCP/IP digitized data packet using a second unlicensed transceiver disposed in said dead zone;

(e) reconverting or converting said TCP/IP digitized data packet to an audio signal in a second device for reconverting or converting signals in said dead zone; and (f) utilizing said audio signal as reconverted or converted RF radio signals in said dead zone wherein said steps of receiving or transmitting, reconverting or converting and utilizing said audio signal are performed in a second device of a system having at least two separate devices.

41. The method of providing RF communications in a dead zone of claim 40 further comprising the step of connecting a standard two-way portable radio to said second device to accomplish the step of utilizing said reconverted or converted RF radio signals in said dead zone.

42. The method of providing RF communications in a dead zone of claim 40 further comprising the step of connecting a standard two-way portable radio to said first device to accomplish the step of utilizing a RF radio signal in an area having RF communications coverage.

43. The method of providing RF communications in a dead zone of claim 40 by utilizing a battery to power the second device in the dead zone.

44. The method of providing RF communications in a dead zone of claim 40 further comprising the step of utilizing a mesh node to extend coverage in said area having RF communications coverage.

45. The method of providing RF communications in a dead zone of claim 40 further comprising the step of housing the components in said dead zone in a portable case.

46. The method of providing RF communications in a dead zone of claim 40 wherein said first Unlicensed ISM transceiver is a point-to-multipoint mesh Unlicensed ISM transceiver.

* * * * *